(12) United States Patent
Lu et al.

(10) Patent No.: US 10,014,686 B2
(45) Date of Patent: Jul. 3, 2018

(54) COMMUTATION CONTROL METHOD AND COMMUTATION CONTROL APPARATUS

(71) Applicant: NR ELECTRIC CO., LTD, Nanjing (CN)

(72) Inventors: Dongbin Lu, Nanjing (CN); Yongping Wang, Nanjing (CN); Zhenxi Wang, Nanjing (CN); Junsheng Wang, Nanjing (CN); Weiming Pan, Nanjing (CN)

(73) Assignee: NR ELECTRIC CO., LTD, Nanjing (CN)

( * ) Notice: Subject to any disclaimer, the term of this patent is extended or adjusted under 35 U.S.C. 154(b) by 0 days.

(21) Appl. No.: 15/538,209

(22) PCT Filed: Sep. 29, 2015

(86) PCT No.: PCT/CN2015/091028
§ 371 (c)(1),
(2) Date: Jun. 21, 2017

(87) PCT Pub. No.: WO2016/101669
PCT Pub. Date: Jun. 30, 2016

(65) Prior Publication Data
US 2017/0353034 A1    Dec. 7, 2017

(30) Foreign Application Priority Data

Dec. 23, 2014  (CN) .......................... 2014 1 0810716

(51) Int. Cl.
*H02M 3/335* (2006.01)
*H02J 3/36* (2006.01)
(Continued)

(52) U.S. Cl.
CPC ................. *H02J 3/36* (2013.01); *H02J 3/02* (2013.01); *H02M 3/33507* (2013.01); *H02J 2003/001* (2013.01); *H02M 1/4208* (2013.01)

(58) Field of Classification Search
None
See application file for complete search history.

(56) References Cited

U.S. PATENT DOCUMENTS 3,886,433 A * 5/1975 Watanabe ............... G05F 1/153
                                                    363/95
5,396,411 A * 3/1995 Konishi .............. H02M 7/7575
                                                    363/35
(Continued)

FOREIGN PATENT DOCUMENTS

CN        102353874 A     2/2012
CN        103078311 A     5/2013
(Continued)

*Primary Examiner* — Jeffrey Gblende
(74) *Attorney, Agent, or Firm* — Gokalp Bayramoglu

(57) ABSTRACT

Provided are a commutation control method and a commutation control apparatus. The method includes: detecting whether transient disturbance in a DC transmission system satisfies a disturbance criterion condition; when the transient disturbance satisfies the disturbance criterion condition, determining a maximum trigger delay angle used in a commutation operation performed by a current converter on an inverter side of the DC transmission system, the determined maximum trigger delay angle being smaller than a maximum trigger delay angle used before the transient disturbance; and controlling the current converter on the inverter side of the DC transmission system to perform the commutation operation based on the determined maximum trigger delay angle.

24 Claims, 6 Drawing Sheets

(51) Int. Cl.
*H02J 3/02* (2006.01)
*H02M 1/42* (2007.01)
*H02J 3/00* (2006.01)

(56) References Cited

U.S. PATENT DOCUMENTS

| | | | | |
|---|---|---|---|---|
| 2010/0259280 | A1* | 10/2010 | Thiede | G01R 31/1227 324/547 |
| 2012/0250371 | A1* | 10/2012 | Fischer De Toledo | H02J 3/16 363/35 |
| 2014/0246854 | A1* | 9/2014 | Spooner | A47G 19/02 290/43 |

FOREIGN PATENT DOCUMENTS

| | | |
|---|---|---|
| CN | 103078312 A | 5/2013 |
| CN | 103187070 A | 6/2013 |
| CN | 104600733 A | 5/2015 |

\* cited by examiner

COMMUTATION CONTROL METHOD AND COMMUTATION CONTROL APPARATUS

CROSS REFERENCE TO RELATED APPLICATIONS

This application is the national phase entry of International Application No. PCT/CN2015/091028, filed on Sep. 29, 2015, which is based upon and claims priority to Chinese Patent Application No. 201410810716.8 filed on Dec. 23, 2014, the entire contents of which are incorporated herein by reference.

TECHNICAL FIELD

The present invention relates to electric power technologies, and more particularly to a commutation control method and a commutation control apparatus.

BACKGROUND

On an inverter side of a DC transmission system, a current converter performs commutation processing according to a maximum trigger delay angle. The commutation processing refers to a physical process of switching a current flowing through the current converter from one current path to another current path by opening or closing a valve group when the current converter is in operation.

In the related art, a DC current instruction value is adopted to determine a commutation voltage drop and a positive slope coefficient K is introduced to ensure a positive slope relationship between the DC voltage and the DC current of the current converter. When small transient disturbance occurs in the DC transmission system, the DC current instruction value stays the same, and the actual DC current is increased due to the disturbance. In this case, if a maximum trigger delay angle that is determined in the related art and is larger than the maximum trigger delay angle before the disturbance is adopted, the actual DC voltage value on the inverter side of the DC transmission system is increased, so that the actual DC current on the inverter side of the DC transmission system is reduced, and thus the DC transmission system recovers to a steady operating point.

However, when large transient disturbance occurs in the DC transmission system, the solution of determining a maximum trigger delay angle in the related art may cause a commutation failure of the current converter or even blocking of the current converter.

SUMMARY OF THE INVENTION

Embodiments of the present invention provide a commutation control method and a commutation control apparatus, which can avoid a commutation failure and ensure stability of a DC transmission system when transient disturbance, for example, large transient disturbance occurs in the DC transmission system.

The technical solutions of the embodiments of the present invention are implemented as follows:

An embodiment of the present invention provides a commutation control method, which includes:

detecting whether transient disturbance in a DC transmission system satisfies a disturbance criterion condition;

when the transient disturbance satisfies the disturbance criterion condition, determining a maximum trigger delay angle used in a commutation operation performed by a current converter on an inverter side of the DC transmission system, the determined maximum trigger delay angle being smaller than a maximum trigger delay angle used before the transient disturbance; and controlling the current converter on the inverter side of the DC transmission system to perform the commutation operation based on the determined maximum trigger delay angle.

Preferably, the determining a maximum trigger delay angle used in a commutation operation performed by a current converter on an inverter side of the DC transmission system includes:

determining the maximum trigger delay angle in one of the following manners:

determining a commutation voltage drop with an actual DC current on the inverter side of the DC transmission system, and determining the maximum trigger delay angle based on the commutation voltage drop;

determining the maximum trigger delay angle in a manner of increasing an extinction angle with an extinction angle reference value increment;

determining the maximum trigger delay angle in a manner of increasing an extinction angle with a trigger delay angle increment;

determining the maximum trigger delay angle in a manner of determining a commutation voltage drop with an actual DC current on the inverter side of the DC transmission system, and in a manner of increasing an extinction angle with an extinction angle reference value increment; and determining the maximum trigger delay angle in a manner of determining a commutation voltage drop with an actual DC current on the inverter side of the DC transmission system, and in a manner of increasing an extinction angle with a trigger delay angle increment;

the commutation voltage drop and the extinction angle being both in negative correlation with the maximum trigger delay angle.

Preferably, the determining a commutation voltage drop with an actual DC current on the inverter side, and determining the maximum trigger delay angle based on the commutation voltage drop includes:

determining the maximum trigger delay angle according to the following formula:

$$AMAX = 180° - \arccos\left[\cos\gamma_o - 2 \cdot d_x \cdot \frac{I_d}{I_{dN}} \cdot \frac{U_{di0N}}{U_{di0}} - K(I_o - I_d)\right]$$

where $\gamma_o$ is an extinction angle reference value, $d_x$ is the relative inductive voltage drop, $I_o$ is a DC current instruction value, $I_d$ is the actual DC current on the inverter side of the DC transmission system, $I_{dN}$ is the rated DC current on the inverter side of the DC transmission system, $U_{di0N}$ is the rated ideal no-load DC voltage, $U_{di0}$ is the actual ideal no-load DC voltage, K is a positive slope coefficient, and AMAX is the maximum trigger delay angle.

Preferably, the determining the maximum trigger delay angle in a manner of increasing an extinction angle with an extinction angle reference value increment includes:

determining the maximum trigger delay angle according to the following formula:

$$AMAX = 180° - \arccos\left[\cos(\gamma_o + \Delta\gamma) - 2 \cdot d_x \cdot \frac{I_o}{I_{dN}} \cdot \frac{U_{di0N}}{U_{di0}} - K(I_o - I_d)\right]$$

where $\gamma_o$ is an extinction angle reference value, $\Delta\gamma$ is an extinction angle reference value increment, $d_x$ is a relative inductive voltage drop, $I_o$ is a DC current instruction value, $I_d$ is an actual DC current on the inverter side of the DC transmission system, $I_{dN}$ is a rated DC current on the inverter side of the DC transmission system, $U_{di0N}$ is a rated ideal no-load DC voltage, $U_{di0}$ is an actual ideal no-load DC voltage, K is a positive slope coefficient, and AMAX is the maximum trigger delay angle.

Preferably, the determining the maximum trigger delay angle in a manner of increasing an extinction angle with a trigger delay angle increment includes:

$$AMAX = 180° - \arccos\left[\cos\gamma_o - 2\cdot d_x \cdot \frac{I_o}{I_{dN}} \cdot \frac{U_{di0N}}{U_{di0}} - K(I_o - I_d)\right] - \Delta\alpha$$

where $\gamma_o$ is an extinction angle reference value, $d_x$ is a relative inductive voltage drop, $I_o$ is a DC current instruction value, $I_d$ is an actual DC current on the inverter side of the DC transmission system, $I_{dN}$ is a rated DC current on the inverter side of the DC transmission system, $U_{di0N}$ is a rated ideal no-load DC voltage, $U_{di0}$ is an actual ideal no-load DC voltage, K is a positive slope coefficient, AMAX is the maximum trigger delay angle, and $\Delta\alpha$ is the trigger delay angle increment.

Preferably, the determining the maximum trigger delay angle in a manner of determining a commutation voltage drop with an actual DC current on the inverter side of the DC transmission system, and in a manner of increasing an extinction angle with an extinction angle reference value increment includes:

determining the maximum trigger delay angle according to the following formula:

$$AMAX = 180° - \arccos\left[\cos(\gamma_o + \Delta\gamma) - 2\cdot d_x \cdot \frac{I_d}{I_{dN}} \cdot \frac{U_{di0N}}{U_{di0}} - K(I_o - I_d)\right]$$

where $\gamma_o$ is an extinction angle reference value, $\Delta\gamma$ is an extinction angle reference value increment, $d_x$ is a relative inductive voltage drop, $I_o$ is a DC current instruction value, $I_d$ is an actual DC current on the inverter side of the DC transmission system, $I_{dN}$ is a rated DC current on the inverter side of the DC transmission system, $U_{di0N}$ is a rated ideal no-load DC voltage, $U_{di0}$ is an actual ideal no-load DC voltage, K is a positive slope coefficient, and AMAX is the maximum trigger delay angle.

Preferably, the determining the maximum trigger delay angle in a manner of determining a commutation voltage drop with an actual DC current on the inverter side of the DC transmission system, and in a manner of increasing an extinction angle with a trigger delay angle increment includes:

determining the maximum trigger delay angle according to the following formula:

$$AMAX = 180° - \arccos\left[\cos\gamma_o - 2\cdot d_x \cdot \frac{I_d}{I_{dN}} \cdot \frac{U_{di0N}}{U_{di0}} - K(I_o - I_d)\right] - \Delta\alpha$$

where $\gamma_o$ is an extinction angle reference value, $d_x$ is a relative inductive voltage drop, $I_o$ is a DC current instruction value, $I_d$ is an actual DC current on the inverter side of the DC transmission system, $I_{dN}$ is a rated DC current on the inverter side of the DC transmission system, $U_{di0N}$ is a rated ideal no-load DC voltage, $U_{di0}$ is an actual ideal no-load DC voltage, K is a positive slope coefficient, AMAX is the maximum trigger delay angle, and $\Delta\alpha$ is the trigger delay angle increment.

Preferably, the disturbance criterion condition includes at least one of the following conditions:

the deviation between an absolute value of the actual DC current on the inverter side of the DC transmission system and an absolute value of the DC current instruction value is greater than a first threshold;

an absolute value of the change of the DC current on the inverter side of the DC transmission system in a unit time is greater than a second threshold;

the deviation between an absolute value of a DC voltage instruction value on the inverter side of the DC transmission system and an absolute value of an actual DC voltage value is greater than a third threshold;

an absolute value of the change of the DC voltage on the inverter side of the DC transmission system in a unit time is greater than a fourth threshold;

an absolute value of the change of different AC power grid-side currents connected to a second pole of the DC transmission system or a second valve group of a local pole of the DC transmission system in a unit time is greater than a fifth threshold;

an absolute value of the change of different AC power grid-side voltages connected to a second pole of the DC transmission system or a second valve group of a local pole of the DC transmission system in a unit time is greater than a sixth threshold;

a DC transmission local pole of the DC transmission system receives at least one of the following signals from the second pole: a blocking signal, a protection blocking signal, an emergency shutdown signal, a phase shift signal, and a commutation failure predicating signal; and a first valve group of a DC transmission local pole of the DC transmission system receives at least one of the following signals from the second valve group: a blocking signal, a protection blocking signal, an emergency shutdown signal, a phase shift signal, and a commutation failure predicating signal.

An embodiment of the present invention provides a commutation control apparatus, which includes:

a detecting unit, for detecting whether transient disturbance in a DC transmission system satisfies a disturbance criterion condition;

a determining unit, for, when the transient disturbance satisfies the disturbance criterion condition, determining a maximum trigger delay angle used in a commutation operation performed by a current converter on an inverter side of the DC transmission system, the determined maximum trigger delay angle being smaller than a maximum trigger delay angle used before the transient disturbance; and a control unit, for controlling the current converter on the inverter side of the DC transmission system to perform the commutation operation based on the determined maximum trigger delay angle.

Preferably, the determining unit is further used for determining the maximum trigger delay angle in one of the following manners:

determining a commutation voltage drop with an actual DC current on the inverter side of the DC transmission system, and determining the maximum trigger delay angle based on the commutation voltage drop;

determining the maximum trigger delay angle in a manner of increasing an extinction angle with an extinction angle reference value increment;

determining the maximum trigger delay angle in a manner of increasing an extinction angle with a trigger delay angle increment;

determining the maximum trigger delay angle in a manner of determining a commutation voltage drop with an actual DC current on the inverter side of the DC transmission system, and in a manner of increasing an extinction angle with an extinction angle reference value increment; and determining the maximum trigger delay angle in a manner of determining a commutation voltage drop with an actual DC current on the inverter side of the DC transmission system, and in a manner of increasing an extinction angle with a trigger delay angle increment;

the commutation voltage drop and the extinction angle being both in negative correlation with the maximum trigger delay angle.

Preferably, the determining unit is further used for determining the maximum trigger delay angle according to the following formula:

$$AMAX = 180° - \arccos\left[\cos\gamma_o - 2 \cdot d_x \cdot \frac{I_d}{I_{dN}} \cdot \frac{U_{di0N}}{U_{di0}} - K(I_o - I_d)\right]$$

where $\gamma_o$ is an extinction angle reference value, $d_x$ is a relative inductive voltage drop, $I_o$ is a DC current instruction value, $I_d$ is an actual DC current on the inverter side of the DC transmission system, $I_{dN}$ is a rated DC current on the inverter side of the DC transmission system, $U_{di0N}$ is a rated ideal no-load DC voltage, $U_{di0}$ is an actual ideal no-load DC voltage, K is a positive slope coefficient, and AMAX is the maximum trigger delay angle.

Preferably, the determining unit is further used for determining the maximum trigger delay angle according to the following formula:

$$AMAX = 180° - \arccos\left[\cos(\gamma_o + \Delta\gamma) - 2 \cdot d_x \cdot \frac{I_o}{I_{dN}} \cdot \frac{U_{di0N}}{U_{di0}} - K(I_o - I_d)\right]$$

where $\gamma_o$ is an extinction angle reference value, $\Delta\gamma$ is an extinction angle reference value increment, $d_x$ is a relative inductive voltage drop, $I_o$ is a DC current instruction value, $I_d$ is an actual DC current on the inverter side of the DC transmission system, $I_{dN}$ is a rated DC current on the inverter side of the DC transmission system, $U_{di0N}$ is a rated ideal no-load DC voltage, $U_{di0}$ is an actual ideal no-load DC voltage, K is a positive slope coefficient, and AMAX is the maximum trigger delay angle.

Preferably, the determining unit is further used for determining the maximum trigger delay angle according to the following formula:

$$AMAX = 180° - \arccos\left[\cos\gamma_o - 2 \cdot d_x \cdot \frac{I_o}{I_{dN}} \cdot \frac{U_{di0N}}{U_{di0}} - K(I_o - I_d)\right] - \Delta\alpha$$

where $\gamma_o$ is an extinction angle reference value, $d_x$ is a relative inductive voltage drop, $I_o$ is a DC current instruction value, $I_d$ is an actual DC current on the inverter side of the DC transmission system, $I_{dN}$ is a rated DC current on the inverter side of the DC transmission system, $U_{di0N}$ is a rated ideal no-load DC voltage, $U_{di0}$ is an actual ideal no-load DC voltage, K is a positive slope coefficient, AMAX is the maximum trigger delay angle, and $\Delta\alpha$ is the trigger delay angle increment.

Preferably, the determining unit is further used for determining the maximum trigger delay angle according to the following formula:

$$AMAX = 180° - \arccos\left[\cos(\gamma_o + \Delta\gamma) - 2 \cdot d_x \cdot \frac{I_d}{I_{dN}} \cdot \frac{U_{di0N}}{U_{di0}} - K(I_o - I_d)\right]$$

where $\gamma_o$ is an extinction angle reference value, $\Delta\gamma$ is an extinction angle reference value increment, $d_x$ is a relative inductive voltage drop, $I_o$ is a DC current instruction value, $I_d$ is an actual DC current on the inverter side of the DC transmission system, $I_{dN}$ is a rated DC current on the inverter side of the DC transmission system, $U_{di0N}$ is a rated ideal no-load DC voltage, $U_{di0}$ is an actual ideal no-load DC voltage, K is a positive slope coefficient, and AMAX is the maximum trigger delay angle.

Preferably, the determining unit is further used for determining the maximum trigger delay angle according to the following formula:

$$AMAX = 180° - \arccos\left[\cos\gamma_o - 2 \cdot d_x \cdot \frac{I_d}{I_{dN}} \cdot \frac{U_{di0N}}{U_{di0}} - K(I_o - I_d)\right] - \Delta\alpha$$

where $\gamma_o$ is an extinction angle reference value, $d_x$ is a relative inductive voltage drop, $I_o$ is a DC current instruction value, $I_d$ is an actual DC current on the inverter side of the DC transmission system, $I_{dN}$ is a rated DC current on the inverter side of the DC transmission system, $U_{di0N}$ is a rated ideal no-load DC voltage, $U_{di0}$ is an actual ideal no-load DC voltage, K is a positive slope coefficient, AMAX is the maximum trigger delay angle, and $\Delta\alpha$ is the trigger delay angle increment.

Preferably, the detecting unit is further used for detecting, according to at least one of the following conditions, whether the transient disturbance in the DC transmission system satisfies the disturbance criterion condition:

the deviation between an absolute value of the actual DC current on the inverter side of the DC transmission system and an absolute value of the DC current instruction value is greater than a first threshold;

an absolute value of the change of the DC current on the inverter side of the DC transmission system in a unit time is greater than a second threshold;

the deviation between an absolute value of a DC voltage instruction value on the inverter side of the DC transmission system and an absolute value of an actual DC voltage value is greater than a third threshold;

an absolute value of the change of the DC voltage on the inverter side of the DC transmission system in a unit time is greater than a fourth threshold;

an absolute value of the change of different AC power grid-side currents connected to a second pole of the DC transmission system or a second valve group of a local pole of the DC transmission system in a unit time is greater than a fifth threshold;

an absolute value of the change of different AC power grid-side voltages connected to a second pole of the DC transmission system or a second valve group of a local pole of the DC transmission system in a unit time is greater than a sixth threshold;

a DC transmission local pole of the DC transmission system receives at least one of the following signals from the second pole: a blocking signal, a protection blocking signal, an emergency shutdown signal, a phase shift signal, and a commutation failure predicating signal; and a first valve group of a DC transmission local pole of the DC transmission system receives at least one of the following signals from the second valve group: a blocking signal, a protection blocking signal, an emergency shutdown signal, a phase shift signal, and a commutation failure predicating signal.

In the embodiments of the present invention, when large transient disturbance occurs in a DC transmission system (that is, the transient disturbance satisfies a transient disturbance criterion condition), a maximum trigger delay angle smaller than that before the large transient disturbance is used in a commutation operation, thereby avoiding a commutation failure and ensuring voltage stability of the DC transmission system.

DETAILED DESCRIPTION OF THE INVENTION

Figure 1:
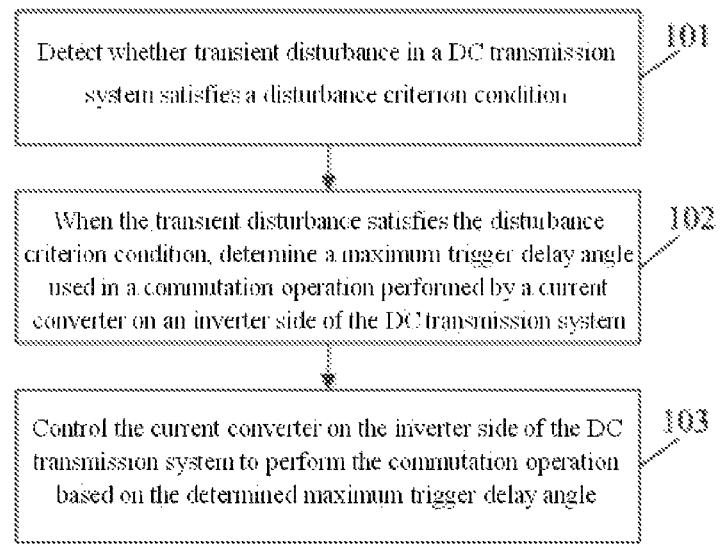
FIG. 1 is a schematic flowchart of the implementation of commutation control according to an embodiment of the present invention.

In order to make the objectives, technical solutions, and advantages of the present invention clearer, the present invention is further described in detail below with reference to embodiments and accompanying drawings. It should be understood that specific embodiments described herein are only intended to explain the present invention instead of limiting the present invention.

The inventor has found in the implementation of the present invention that, a maximum trigger delay angle used in commutation processing performed by a current converter on an inverter side is determined in the following manner in the related art:

$$AMAX = 180° - \arccos\left[\cos \gamma_o - 2 \cdot d_x \cdot \frac{I_o}{I_{dN}} \cdot \frac{U_{di0N}}{U_{di0}} - K(I_o - I_d)\right] \quad (1)$$

where $\gamma_o$ is an extinction angle reference value, $d_x$ is a relative inductive voltage drop, $I_o$ is a DC current instruction value, $I_d$ is an actual DC current on the inverter side of the DC transmission system, $I_{dN}$ is a rated DC current on the inverter side of the DC transmission system, $U_{di0N}$ is a rated ideal no-load DC voltage on the inverter side of the DC transmission system, $U_{di0}$ is an actual ideal no-load DC voltage on the inverter side of the DC transmission system, K is a positive slope coefficient, and AMAX is the maximum trigger delay angle.

It can be seen that, a DC current instruction value is adopted to determine a commutation voltage drop (which corresponds to $$2 \cdot d_x \cdot \frac{I_o}{I_{dN}} \cdot \frac{U_{di0N}}{U_{di0}})$$

and a positive slope coefficient K is introduced to ensure a positive slope relationship between an actual DC voltage value and an actual DC current value. When small transient disturbance occurs on the inverter side of the DC transmission system, the DC current instruction value $I_o$ stays the same, the actual DC current $I_d$ is increased due to the disturbance, and the maximum trigger delay angle AMAX determined according to a maximum trigger delay angle control strategy in the related art is larger than that before the disturbance. Therefore, the DC voltage on the inverter side is increased, the actual DC current $I_d$ is reduced, and thus the DC transmission system recovers to a steady operating point, that is, the transient disturbance is eliminated in a manner of increasing the DC voltage.

The inventor has found that, the above processing is only applicable to the circumstance that the DC transmission system is in steady operation or small transient disturbance occurs; and large transient disturbance is caused in the presence of the following faults:

mono-polar blocking occurs when high-voltage DC transmission is in bipolar operation; a pulse missing fault occurs in one of two valve groups in a series connection on an inverter side for ultra-high-voltage DC transmission, one valve group on the inverter side stops operation when there is no communication, or mono-polar blocking occurs in bipolar operation; a single AC power grid fault occurs on the inverter side for ultra-high-voltage DC transmission where high-voltage and low-voltage valve groups are hierarchically connected to two AC power grids.

When large transient disturbance occurs on an inverter side, the DC voltage on the inverter side drops too much relative to the DC voltage on a rectifier side, a current regulator on the rectifier side cannot regulate the DC current in time in accordance with a DC current instruction value, the DC current transmitted to a valve group in normal operation on the inverter side rapidly rises, and the actual DC current is much greater than the DC current instruction value. In this case, a commutation voltage drop determined by using the DC current instruction value is much smaller than an actual commutation voltage drop, the maximum trigger delay angle determined according to the maximum trigger delay angle control strategy provided in the related art is larger than that before the disturbance, an actual extinction angle value is much smaller than an extinction angle reference value, and the commutation margin is reduced. Therefore, a commutation failure easily occurs in the current converter, the DC voltage of the current converter is much lower when a commutation failure occurs, the actual DC current is further increased, the actual extinction angle value is further reduced, and continuous commutation failures or even blocking of the current converter may easily occur.

In view of the above analysis, an embodiment of the present invention describes a commutation control method, which is applicable to commutation control in a high-voltage DC transmission system and an ultra-high-voltage DC transmission system. As shown in FIG. 1, the commutation control method described by the present embodiment includes the following steps:

Step 101: Detect whether transient disturbance in a DC transmission system satisfies a disturbance criterion condition.

The disturbance criterion condition may be at least one of the following conditions:

(1) The deviation between an absolute value of an actual DC current of a current converter on an inverter side of the DC transmission system and an absolute value of a DC current instruction value is greater than a first threshold, that is, $|I_d|-|I_o|>I_{diff}$ where $I_o$ is the DC current instruction value, $I_d$ is the actual DC current, and $I_{diff}$ is a DC current deviation value (corresponding to the first threshold) and is 0.01 to 0.3 $I_{dN}$, $I_{dN}$ being a rated DC current value.

(2) An absolute value of the change of the DC current on the inverter side of the DC transmission system in a unit time is greater than a second threshold, that is, $$\left|\frac{d I_d}{d t}\right| > K_{delta\_Id};$$

where $K_{delta\_Id}$ is a derivative constant value of DC current with respect to time (corresponding to the second threshold) and is 50 to 1000 $I_{d0}$, $I_{d0}$ being the actual DC current of the current converter before disturbance.

(3) The deviation between an absolute value of a DC voltage instruction value on the inverter side of the DC transmission system and an absolute value of an actual DC voltage value is greater than a third threshold, that is, $|U_o|-|U_d|>U_{diff}$;

where $U_o$ is the DC voltage instruction value, $U_d$ is the actual DC voltage value, and $U_{diff}$ is a DC voltage deviation constant value (corresponding to the third threshold) and is 0.01 to 0.5 $U_{dN}$, $U_{dN}$ being a rated DC voltage.

(4) An absolute value of the change of the DC voltage on the inverter side of the DC transmission system in a unit time is greater than a fourth threshold, that is, $$\left|\frac{d U_d}{d t}\right| > K_{delta\_Ud};$$

where $K_{delta\_Ud}$ is a derivative constant value of DC voltage with respect to time (corresponding to the fourth threshold) and is 10 to 200 $U_{d0}$, $U_{d0}$ being the actual DC voltage value before disturbance.

(5) An absolute value of the change of different AC power grid-side currents connected to a second pole of the DC transmission system or a second valve group of a local pole of the DC transmission system in a unit time is greater than a fifth threshold, that is, $$\left|\frac{d I_A}{d t}\right| > K_{delta\_IP}, \left|\frac{d I_B}{d t}\right| > K_{delta\_IP}, \text{ or } \left|\frac{d I_C}{d t}\right| > K_{delta\_IP};$$

where $I_A$, $I_B$, $I_C$ are different AC power grid-side A-phase, B-phase, C-phase currents connected to the second pole of the DC transmission system or the second valve group of the local pole of the DC transmission system, $K_{delta\_IP}$ is a derivative constant value of phase current with respect to time (corresponding to the fifth threshold) and is 350 to 1200 $I_m$, $I_m$ being an AC current peak value before disturbance, the second pole is a pole other than a DC transmission local pole of the DC transmission system, the second valve group is a valve group other than a first valve group in the DC transmission local pole of the DC transmission system, and the first valve group is a target valve group for judging whether a disturbance criterion condition is satisfied. For example, where a DC transmission local pole of a DC transmission system includes a valve group 1 and a valve group 2 in a series connection, if whether a disturbance criterion condition is satisfied is judged for the valve group 1, the valve group 1 is the first valve group, and the valve group 2 is the second valve group.

(6) An absolute value of the change of different AC power grid-side voltages connected to a second pole of the DC transmission system or a second valve group of a local pole of the DC transmission system in a unit time is greater than a sixth threshold, that is, $$\left|\frac{d U_A}{d t}\right| > K_{delta\_UP}, \left|\frac{d U_B}{d t}\right| > K_{delta\_UP}, \left|\frac{d U_C}{d t}\right| > K_{delta\_UP};$$

where $U_A$, $U_B$, $U_C$ are different AC power grid-side A-phase, B-phase, C-phase voltages connected to the second pole of the DC transmission system or the second valve group of the local pole of the DC transmission system, $K_{delta\_UP}$ is a derivative constant value of phase voltage with respect to time (corresponding to the sixth threshold) and is 350 to 1200 $U_m$, $U_m$ being an AC voltage peak value before disturbance, the second pole is a pole other than a DC transmission local pole of the DC transmission system, the second valve group is a valve group other than a first valve group in the DC transmission local pole of the DC transmission system, and the first valve group is a target valve group for judging whether a disturbance criterion condition is satisfied. For example, where a DC transmission local pole of a DC transmission system includes a valve group 1 and a valve group 2 in a series connection, if whether a disturbance criterion condition is satisfied is judged for the valve group 1, the valve group 1 is the first valve group, and the valve group 2 is the second valve group.

(7) A DC transmission local pole of the DC transmission system receives at least one of the following signals from the second pole: a blocking signal, a protection blocking signal, an emergency shutdown signal, a phase shift signal, and a commutation failure predicating signal.

(8) A first valve group of a DC transmission local pole of the DC transmission system receives at least one of the following signals from the second valve group: a blocking signal, a protection blocking signal, an emergency shutdown signal, a phase shift signal, and a commutation failure predicating signal.

It should be noted that, large transient disturbance and small transient disturbance are relative to each other, and when disturbance does not satisfy a disturbance criterion condition, that is, small transient disturbance occurs or a DC transmission system is in steady operation, a commutation voltage drop may be determined based on the formula (1), that is, based on a DC current instruction value, and a maximum trigger delay angle is determined based on the commutation voltage drop.

Step 102: When the transient disturbance satisfies the disturbance criterion condition, determine a maximum trigger delay angle used in commutation processing performed by the current converter on the inverter side of the DC transmission system.

Here, the determined maximum trigger delay angle is smaller than a maximum trigger delay angle used before the transient disturbance. Different from the manner of determining a maximum trigger delay angle when the DC transmission system is in steady operation or small transient disturbance occurs (the maximum trigger delay angle control mechanism is actually to eliminate disturbance in a manner of increasing the DC voltage when the DC transmission system is in steady operation or small transient disturbance occurs), when large transient disturbance occurs, with the control goal of not causing a commutation failure, the disturbance elimination processing may be done on a rectifier side of the DC transmission system, so that the DC transmission system recovers to a steady operating point. It should be noted that, the current converter described in the embodiment of the present invention is composed of valve groups (each consisting of non-turn-off thyristors); therefore, the valve groups on the inverter side of the DC transmission system may be controlled to achieve the subsequent control of the current converter on the inverter side of the DC transmission system to perform commutation processing in accordance with the maximum trigger delay angle.

The maximum trigger delay angle may be determined in the following manners:

1) determining a commutation voltage drop with the actual DC current of the current converter, and determining the maximum trigger delay angle based on the commutation voltage drop;

2) determining the maximum trigger delay angle in a manner of increasing an extinction angle with an extinction angle reference value increment;

3) determining the maximum trigger delay angle in a manner of increasing an extinction angle with a trigger delay angle increment;

4) determining the maximum trigger delay angle in a manner of determining a commutation voltage drop with an actual DC current on the inverter side of the DC transmission system, and in a manner of increasing an extinction angle with an extinction angle reference value increment; and 5) determining the maximum trigger delay angle in a manner of determining a commutation voltage drop with an actual DC current on the inverter side of the DC transmission system, and in a manner of increasing an extinction angle with a trigger delay angle increment.

The above manners of determining the maximum trigger delay angle are illustrated below.

In the manner 1), a commutation voltage drop is determined with the actual DC current on the inverter side of the DC transmission system, and the maximum trigger delay angle is determined based on the commutation voltage drop. As an example, the following formula may be adopted:

$$AMAX = 180° - \arccos\left[\cos \gamma_o - 2 \cdot d_x \cdot \frac{I_d}{I_{dN}} \cdot \frac{U_{di0N}}{U_{di0}} - K(I_o - I_d)\right] \quad (2)$$

where $\gamma_o$ is an extinction angle reference value, $d_x$ is a relative inductive voltage drop, $I_o$ is a DC current instruction value, $I_d$ is the actual DC current, $I_{dN}$ is a rated DC current, $U_{di0N}$ is a rated ideal no-load DC voltage, $U_{di0}$ is an actual ideal no-load DC voltage, K is a positive slope coefficient, and AMAX is the maximum trigger delay angle.

In the manner 2), the maximum trigger delay angle is determined in a manner of increasing an extinction angle with an extinction angle reference value increment. As an example, the following formula may be adopted:

$$AMAX = \\ 180° - \arccos\left[\cos (\gamma_o + \Delta\gamma) - 2 \cdot d_x \cdot \frac{I_o}{I_{dN}} \cdot \frac{U_{di0N}}{U_{di0}} - K(I_o - I_d)\right] \quad (3)$$

where $\gamma_o$ is an extinction angle reference value, $d_x$ is a relative inductive voltage drop, $I_o$ is a DC current instruction value, $I_d$ is the actual DC current, $I_{dN}$ is a rated DC current, $U_{di0N}$ is a rated ideal no-load DC voltage, $U_{di0}$ is an actual ideal no-load DC voltage, K is a positive slope coefficient, AMAX is the maximum trigger delay angle; $\Delta\gamma$ is the extinction angle reference value increment, and may be a constant value or dynamic value, for example, when $\Delta\gamma$ is a constant value, $\Delta\gamma$ takes a constant value according to the magnitude of transient disturbance of the DC transmission system and is in a range of 0 to 35°; in another example, when $\Delta\gamma$ is a dynamic value, the value of $\Delta\gamma$ may change according to the magnitude of disturbance, if the disturbance grows, $\Delta\gamma$ is larger, and on the contrary, $\Delta\gamma$ is smaller; when the transient disturbance is eliminated, the value of $\Delta\gamma$ may be reduced to 0 with a downward step function through a low-pass filter, thereby ensuring the stability of the DC transmission system.

In the manner 3), the maximum trigger delay angle is determined in a manner of increasing an extinction angle with a trigger delay angle increment (which is used for reducing the maximum trigger delay angle). As an example, the following formula may be adopted:

$$AMAX = 180° - \arccos\left[\cos \gamma_o - 2 \cdot d_x \cdot \frac{I_o}{I_{dN}} \cdot \frac{U_{di0N}}{U_{di0}} - K(I_o - I_d)\right] - \Delta\alpha \quad (4)$$

where $\gamma_o$ is an extinction angle reference value, $d_x$ is a relative inductive voltage drop, $I_o$ is a DC current instruction value, $I_d$ is the actual DC current, $I_{dN}$ is a rated DC current, $U_{di0N}$ is a rated ideal no-load DC voltage, $U_{di0}$ is an actual ideal no-load DC voltage, K is a positive slope coefficient, AMAX is the maximum trigger delay angle; $\Delta\alpha$ is the trigger delay angle increment (corresponding to the increment of the maximum trigger delay angle), and may be a constant value or dynamic value, for example, when $\Delta\alpha$ is a constant value, $\Delta\alpha$ takes a constant value according to the magnitude of transient disturbance of the DC transmission system and is in a range of 0 to 30°; in another example, when $\Delta\alpha$ is a dynamic value, the value of $\Delta\alpha$ may change according to the magnitude of disturbance, if the disturbance grows, $\Delta\alpha$ a is larger, and on the contrary, $\Delta\alpha$ a is smaller; when the transient disturbance is eliminated, the value of $\Delta\alpha$ may be reduced to 0 with a downward step function through a low-pass filter, thereby ensuring the stability of the DC transmission system.

In the manner 4), the maximum trigger delay angle is determined in a manner of determining a commutation voltage drop with the actual DC current on the inverter side of the DC transmission system, and in a manner of increasing an extinction angle with an extinction angle reference value increment. As an example, the following formula may be adopted:

$$AMAX = \\ 180° - \arccos\left[\cos(\gamma_o + \Delta\gamma) - 2 \cdot d_x \cdot \frac{I_d}{I_{dN}} \cdot \frac{U_{di0N}}{U_{di0}} - K(I_o - I_d)\right] \quad (5)$$

where $\gamma_o$ is an extinction angle reference value, $d_x$ is a relative inductive voltage drop, $I_o$ is a DC current instruction value, $I_d$ is the actual DC current, $I_{dN}$ is a rated DC current, $U_{di0N}$ is a rated ideal no-load DC voltage, $U_{di0}$ is an actual ideal no-load DC voltage, K is a positive slope coefficient, AMAX is the maximum trigger delay angle; $\Delta\gamma$ is the extinction angle reference value increment, and may be a constant value or dynamic value, for example, when $\Delta\gamma$ is a constant value, $\Delta\gamma$ takes a constant value according to the magnitude of transient disturbance of the DC transmission system and is in a range of 0 to 35°; in another example, when $\Delta\gamma$ is a dynamic value, the value of $\Delta\gamma$ may change according to the magnitude of disturbance, if the disturbance grows, $\Delta\gamma$ is larger, and on the contrary, $\Delta\gamma$ is smaller; when the transient disturbance is eliminated, the value of $\Delta\gamma$ may be reduced to 0 with a downward step function through a low-pass filter, thereby ensuring the stability of the DC transmission system.

In the manner 5), the maximum trigger delay angle is determined in a manner of determining a commutation voltage drop with the actual DC current on the inverter side of the DC transmission system, and in a manner of increasing an extinction angle with a trigger delay angle increment. As an example, the following formula may be adopted:

$$AMAX = 180° - \arccos\left[\cos\gamma_o - 2 \cdot d_x \cdot \frac{I_d}{I_{dN}} \cdot \frac{U_{di0N}}{U_{di0}} - K(I_o - I_d)\right] - \Delta\alpha \quad (6)$$

where $\gamma_o$ is an extinction angle reference value, $d_x$ is a relative inductive voltage drop, $I_o$ is a DC current instruction value, $I_d$ is the actual DC current, $I_{dN}$ is a rated DC current, $U_{di0N}$ is a rated ideal no-load DC voltage, $U_{di0}$ is an actual ideal no-load DC voltage, K is a positive slope coefficient, AMAX is the maximum trigger delay angle; $\Delta\alpha$ a is the trigger delay angle increment, and may be a constant value or dynamic value, for example, when $\Delta\alpha$ a is a constant value, $\Delta\alpha$ a takes a constant value according to the magnitude of transient disturbance of the DC transmission system and is in a range of 0 to 30°; in another example, when $\Delta\alpha$ a is a dynamic value, the value of $\Delta\alpha$ a may change according to the magnitude of disturbance, if the disturbance grows, $\Delta\alpha$ a is larger, and on the contrary, $\Delta\alpha$ a is smaller; when the transient disturbance is eliminated, the value of $\Delta\alpha$ a may be reduced to 0 with a downward step function through a low-pass filter, thereby ensuring the stability of the DC transmission system.

In Step 103, the current converter on the inverter side of the DC transmission system is controlled to perform the commutation operation based on the determined maximum trigger delay angle.

The on/off of the current converter on the inverter side of the DC transmission system is controlled based on the maximum trigger delay angle, so that the current converter completes commutation processing, thereby avoiding a commutation failure; the voltage stability of the DC transmission system is ensured, a current controller on the rectifier side may be used to eliminate disturbance, and the DC transmission system recovers to a steady operating point.

It should be noted that, in Step 101, when it is detected that disturbance occurs and the disturbance does not satisfy the disturbance criterion condition, or when steady operation is detected, according to the formula (1) provided in the related art, a DC current instruction value is adopted to determine a commutation voltage drop and a positive slope coefficient K is introduced to ensure a positive slope relationship between a DC voltage and a DC current of the current converter. When small transient disturbance occurs on the inverter side, the DC current instruction value $I_o$ stays the same, the DC current $I_d$ is increased due to the disturbance, and the maximum trigger delay angle AMAX determined according to a maximum trigger delay angle control mechanism in the related art is larger than that before the disturbance. Therefore, the DC voltage $U_d$ on the inverter side is increased, the actual DC current $I_d$ is reduced, and thus the DC transmission system recovers to a steady operating point.

When large transient disturbance occurs on the inverter side, the maximum trigger delay angle is determined according to the description in Step 102, that is, where the actual DC current is increased due to the occurrence of large transient disturbance on the inverter side of the DC transmission system, disturbance elimination is not performed in a manner of increasing the DC voltage when the maximum trigger delay angle is determined on the inverter side, and instead, the maximum trigger delay angle is smaller than that before the large transient disturbance. With the control goal of not causing a commutation failure, correspondingly, a current controller on the rectifier side may be used to eliminate disturbance. As such, the transient disturbance can be eliminated, and also the occurrence of a commutation failure during disturbance elimination in the related art is avoided, thereby ensuring that the DC transmission system can recover to a steady operating point in the presence of large transient disturbance.

Descriptions are provided below with reference to actual application scenarios.

Figure 2A:
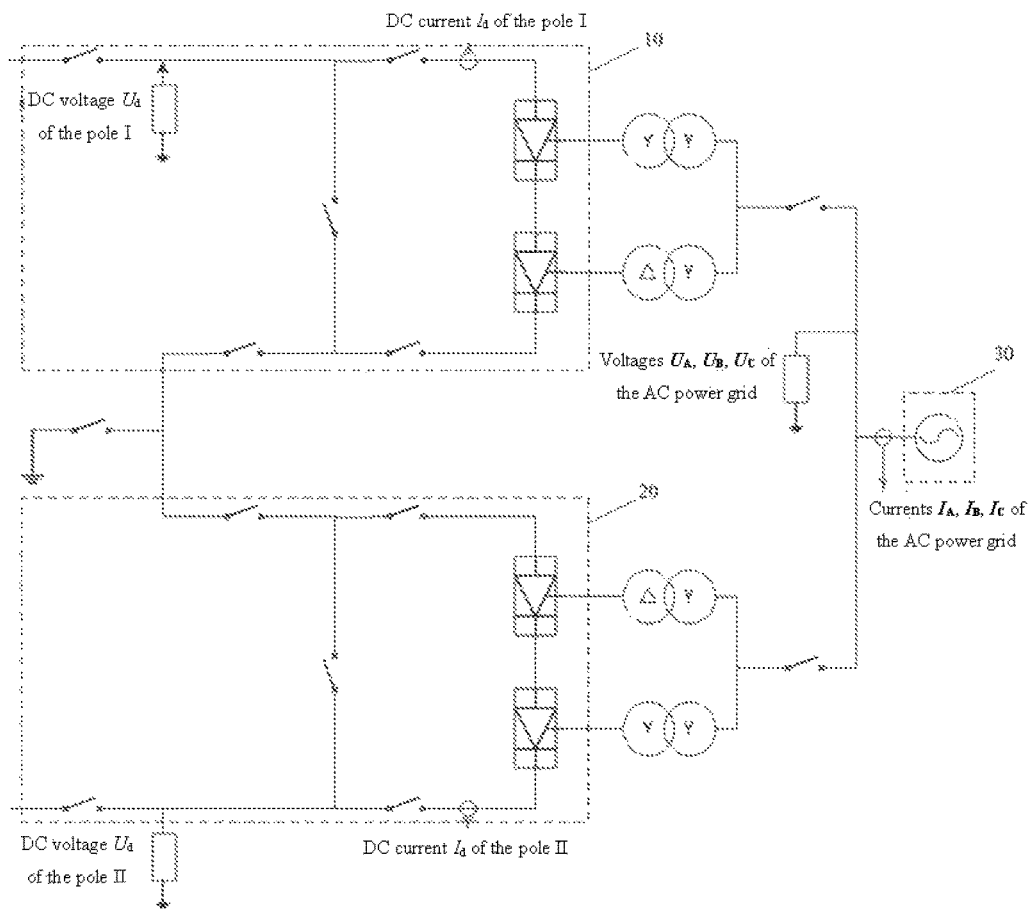
FIG. 2a is a first schematic diagram of commutation control performed in a DC transmission system according to an embodiment of the present invention.
Figure 2B:
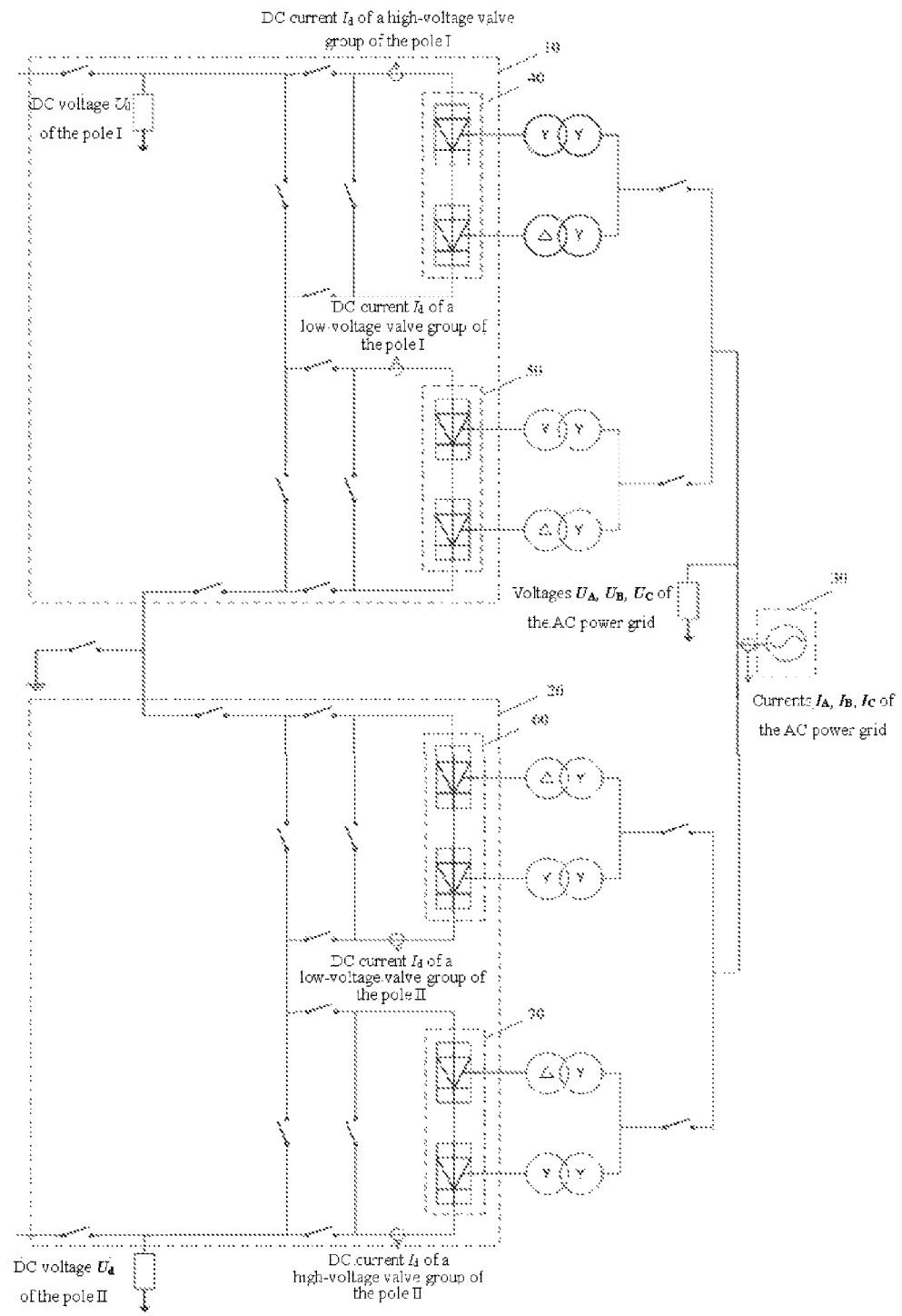
FIG. 2b is a second schematic diagram of commutation control performed in a DC transmission system according to an embodiment of the present invention.
Figure 2C:
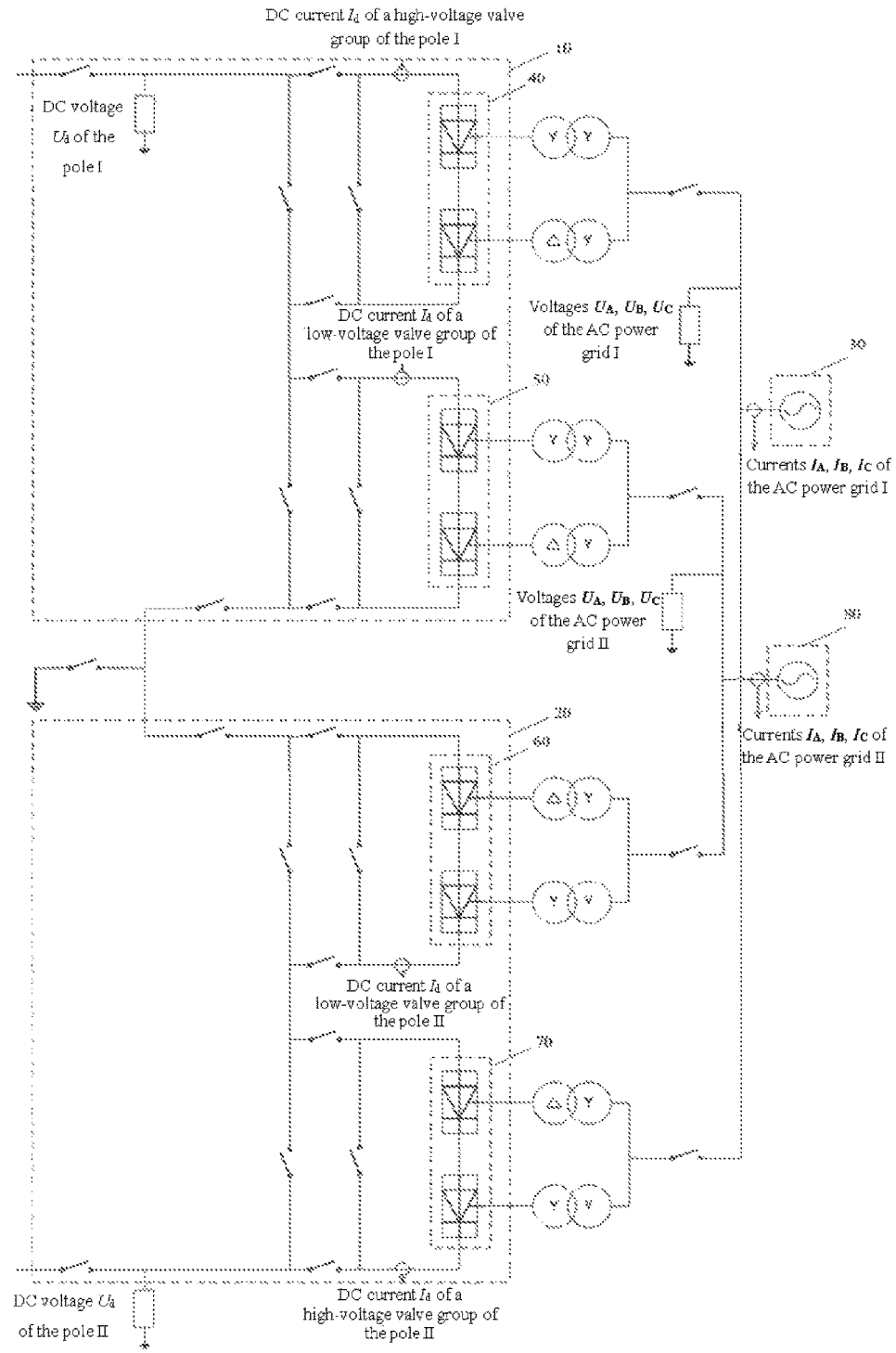
FIG. 2c is a third schematic diagram of commutation control performed in a DC transmission system according to an embodiment of the present invention.

In FIG. 2a, FIG. 2b, and FIG. 2c, when a pole II20 is blocked, whether a disturbance criterion condition is satisfied is judged for a pole I10 (that is, it is judged whether large transient disturbance occurs), so as to trigger running of a maximum trigger delay angle control strategy, thereby re-determining the maximum trigger delay angle (smaller than that before the disturbance). The disturbance criterion condition may be at least one of the following conditions:

1) it is detected that the deviation between an absolute value of the DC current $I_d$ flowing through the pole I10 on the inverter side and an absolute value of the DC current instruction value $I_o$ is greater than $I_{diff}$;

2) an absolute value of the change of the DC current $I_d$ flowing through the inverter side in a unit time is greater than $K_{delta\_Id}$;

3) the deviation between an absolute value of the DC voltage instruction value $U_o$ on the inverter side and an absolute value of the DC voltage $U_d$ is greater than $U_{diff}$;

4) an absolute value of the change of the DC voltage $U_d$ on the inverter side in a unit time is greater than $K_{delta\_Ud}$; and 5) the pole I10 receives at least one of the following signals: a blocking signal, a protection blocking signal, an emergency shutdown signal, and a phase shift signal from the pole II20.

If the condition is satisfied, the maximum trigger delay angle control processing strategy is run; likewise, when the pole I10 is blocked, the processing of the pole II20 is similar.

In FIG. 2b and FIG. 2c, when the pole I10 is in a full-valve group operation state and pulse missing occurs in control of a high-voltage valve group 40 on the inverter side or the high-voltage valve group 40 is shut down when there is no communication between stations, whether the disturbance criterion condition is satisfied is judged for a low-voltage valve group 50 of the pole I10 (that is, it is judged whether large transient disturbance occurs), so as to trigger running of the maximum trigger delay angle control strategy, thereby re-determining the maximum trigger delay angle. The disturbance criterion condition may be at least one of the following conditions:

1) it is detected on the inverter side that the deviation between an absolute value of the DC current $I_d$ flowing through the low-voltage valve group 50 of the pole I10 and an absolute value of the DC current instruction value $I_o$, is greater than $I_{diff}$;

2) an absolute value of the change of the DC current $I_d$ flowing through the low-voltage valve group 50 in a unit time is greater than $K_{delta\_Id}$;

3) the deviation between an absolute value of the DC voltage instruction value $U_o$ and an absolute value of the DC voltage $U_d$ is greater than $U_{diff}$;

4) an absolute value of the change of the DC voltage $U_d$ in a unit time is greater than $K_{delta\_Ud}$; and 5) the low-voltage valve group 50 receives at least one of the following signals from the high-voltage valve group 40: a blocking signal, a protection blocking signal, an emergency shutdown signal, and a phase shift signal.

Likewise, when pulse missing occurs in control of the low-voltage valve group 50 on the inverter side or the low-voltage valve group 50 is shut down when there is no communication between stations, whether the disturbance criterion condition is satisfied is judged for the high-voltage valve group 40 of the pole I10 (that is, it is judged whether large transient disturbance occurs), so as to trigger running of the maximum trigger delay angle control strategy, thereby re-determining the maximum trigger delay angle. The above processing is also applicable to a high-voltage valve group 70 and a low-voltage valve group 60 of the pole II20.

In FIG. 2c, when the pole I10 on the inverter side is in a full-valve group operation state and a single-phase-to-ground fault, a two-phase short-circuit fault, a two-phase-to-ground fault, or a three-phase short-circuit fault occurs in an AC power grid 130 connected to the high-voltage valve group 40, whether the disturbance criterion condition is satisfied is judged for the low-voltage valve group 50 of the pole I10 (that is, it is judged whether large transient disturbance occurs), so as to trigger running of the maximum trigger delay angle control strategy, thereby re-determining the maximum trigger delay angle. The disturbance criterion condition may be at least one of the following conditions:

1) it is detected that the deviation between an absolute value of the DC current $I_d$ flowing through the low-voltage valve group 50 of the pole I10 and an absolute value of the DC current instruction value $I_o$ is greater than $I_{diff}$;

2) an absolute value of the change of the DC current $I_d$ flowing through the inverter side in a unit time is greater than $K_{delta\_Id}$;

3) the deviation between an absolute value of the DC voltage instruction value $U_o$ and an absolute value of the DC voltage $U_d$ is greater than $U_{diff}$;

4) an absolute value of the change of the DC voltage $U_d$ in a unit time is greater than $K_{delta\_Ud}$;

5) it is measured by the low-voltage valve group 50 that an absolute value of the change of AC power grid-side currents $I_A$, $I_B$, $I_C$ connected to the high-voltage valve group 40 in a unit time is greater than $K_{delta\_IP}$;

6) it is measured by the low-voltage valve group 50 that an absolute value of the change of AC power grid-side voltages $U_A$, $U_B$, $U_C$ connected to the high-voltage valve group 40 in a unit time is greater than $K_{delta\_UP}$; and 7) the low-voltage valve group 50 receives at least one of the following signals from the high-voltage valve group 40: a blocking signal, a protection blocking signal, an emergency shutdown signal, a phase shift signal, and a commutation failure predicating signal.

If the disturbance criterion condition is satisfied, the maximum trigger delay angle control strategy is run; likewise, when an AC power grid II80 connected to the low-voltage valve group 50 on the inverter side fails, whether the disturbance criterion condition is satisfied is judged for the high-voltage valve group 40 of the pole I10. The above processing is also applicable to the high-voltage valve group 70 and the low-voltage valve group 60 of the pole II20.

When the deviation between an absolute value of the DC current $I_d$ of the current converter and an absolute value of the DC current instruction value $I_o$ is greater than $I_{diff}$ due to other faults on the inverter side, it is also determined that large transient disturbance occurs in the DC transmission system.

Figure 3:
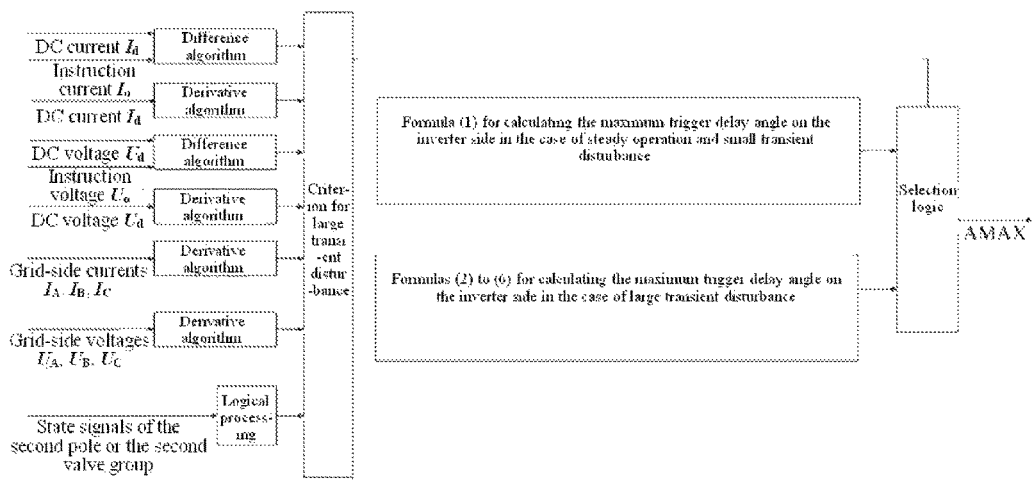
FIG. 3 is a block diagram of the implementation of a maximum trigger delay angle control strategy on an inverter side of the DC transmission system according to an embodiment of the present invention.

FIG. 3 is a schematic diagram of the implementation of the maximum trigger delay angle control strategy. The above current and voltage deviations and derivative algorithms as well as state signals indicating blocking, emergency shutdown, commutation failure predication and the like of the second pole and the second valve group are used as inputs of a criterion logic for large transient disturbance, and the criterion logic for large transient disturbance is based on at least one of the inputs. If it is determined that the system is in steady operation and small transient disturbance occurs, the output of the criterion logic for large transient disturbance is 0, and a selection logic is triggered to select the use of a DC current instruction value to calculate a commutation voltage drop, that is, to determine a maximum trigger delay angle algorithm according to the formula (1). If it is determined that large transient disturbance occurs, the output of the criterion logic for large transient disturbance is 1, and the selection logic is triggered to select any one of the formulas (2) to (6) to determine the maximum trigger delay angle.

Figure 4:
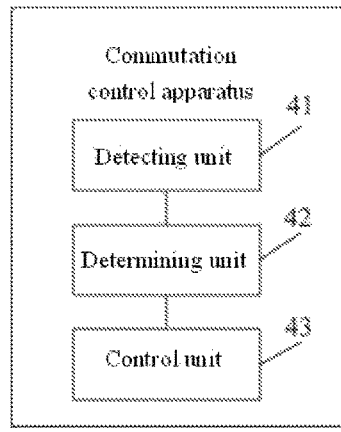
FIG. 4 is a first schematic structural diagram of a commutation control apparatus according to an embodiment of the present invention.

An embodiment of the present invention further describes a commutation control apparatus, for executing the above commutation control processing. As shown in FIG. 4, the commutation control apparatus includes:

a detecting unit 41, for detecting whether transient disturbance in a DC transmission system satisfies a disturbance criterion condition;

a determining unit 42, for, when the transient disturbance satisfies the disturbance criterion condition, determining a maximum trigger delay angle used in a commutation operation performed by a current converter on an inverter side of the DC transmission system, the determined maximum trigger delay angle being smaller than a maximum trigger delay angle used before the transient disturbance; and a control unit 43, for controlling the current converter on the inverter side of the DC transmission system to perform the commutation operation based on the determined maximum trigger delay angle.

The determining unit 42 may determine the maximum trigger delay angle in one of the following manners:

1) determining a commutation voltage drop with an actual DC current on the inverter side of the DC transmission system, and determining the maximum trigger delay angle based on the commutation voltage drop;

2) determining the maximum trigger delay angle in a manner of increasing an extinction angle with an extinction angle reference value increment;

3) determining the maximum trigger delay angle in a manner of increasing an extinction angle with a trigger delay angle increment;

4) determining the maximum trigger delay angle in a manner of determining a commutation voltage drop with an actual DC current on the inverter side of the DC transmission system, and in a manner of increasing an extinction angle with an extinction angle reference value increment; and 5) determining the maximum trigger delay angle in a manner of determining a commutation voltage drop with an actual DC current on the inverter side of the DC transmission system, and in a manner of increasing an extinction angle with a trigger delay angle increment;

the commutation voltage drop and the extinction angle being both in negative correlation with the maximum trigger delay angle.

In the manner 1), the determining unit 42 is further used for determining the maximum trigger delay angle according to the formula (2):

$$AMAX = 180° - \arccos\left[\cos \gamma_o - 2 \cdot d_x \cdot \frac{I_d}{I_{dN}} \cdot \frac{U_{di0N}}{U_{di0}} - K(I_o - I_d)\right] \quad (2)$$

where $\gamma_o$ is an extinction angle reference value, $d_x$ is a relative inductive voltage drop, $I_o$ is a DC current instruction value, $I_d$ is an actual DC current on the inverter side of the DC transmission system, $I_{dN}$ is a rated DC current on the inverter side of the DC transmission system, $U_{di0N}$ is a rated ideal no-load DC voltage, $U_{di0}$ is an actual ideal no-load DC voltage, K is a positive slope coefficient, and AMAX is the maximum trigger delay angle.

In the manner 2), the determining unit 42 is further used for determining the maximum trigger delay angle according to the formula (3):

The determining unit 42 is used for determining the maximum trigger delay angle according to the following formula:

$$AMAX = \quad (3)$$
$$180° - \arccos\left[\cos (\gamma_o + \Delta\gamma) - 2 \cdot d_x \cdot \frac{I_o}{I_{dN}} \cdot \frac{U_{di0N}}{U_{di0}} - K(I_o - I_d)\right]$$

where $\gamma_o$ is an extinction angle reference value, $\Delta\gamma$ is an extinction angle reference value increment, $d_x$ is a relative inductive voltage drop, $I_o$ is a DC current instruction value, $I_d$ is an actual DC current on the inverter side of the DC transmission system, $I_{dN}$ is a rated DC current on the inverter side of the DC transmission system, $U_{di0N}$ is a rated ideal no-load DC voltage, $U_{di0}$ is an actual ideal no-load DC voltage, K is a positive slope coefficient, and AMAX is the maximum trigger delay angle.

In the manner 3), the determining unit 42 is further used for determining the maximum trigger delay angle according to the formula (4):

$$AMAX = 180° - \arccos\left[\cos \gamma_o - 2 \cdot d_x \cdot \frac{I_o}{I_{dN}} \cdot \frac{U_{di0N}}{U_{di0}} - K(I_o - I_d)\right] - \Delta\alpha \quad (4)$$

where $\gamma_o$ is an extinction angle reference value, $d_x$ is a relative inductive voltage drop, $I_o$ is a DC current instruction value, $I_d$ is an actual DC current on the inverter side of the DC transmission system, $I_{dN}$ is a rated DC current on the inverter side of the DC transmission system, $U_{di0N}$ is a rated ideal no-load DC voltage, $U_{di0}$ is an actual ideal no-load DC voltage, K is a positive slope coefficient, AMAX is the maximum trigger delay angle, and $\Delta\alpha$ a is the trigger delay angle increment.

In the manner 4), the determining unit 42 is further used for determining the maximum trigger delay angle according to the formula (5):

$$AMAX = \quad (5)$$
$$180° - \arccos\left[\cos (\gamma_o + \Delta\gamma) - 2 \cdot d_x \cdot \frac{I_d}{I_{dN}} \cdot \frac{U_{di0N}}{U_{di0}} - K(I_o - I_d)\right]$$

where $\gamma_o$ is an extinction angle reference value, $\Delta\gamma$ is an extinction angle reference value increment, $d_x$ is a relative inductive voltage drop, $I_o$ is a DC current instruction value, $I_d$ is an actual DC current on the inverter side of the DC transmission system, $I_{dN}$ is a rated DC current on the inverter side of the DC transmission system, $U_{di0N}$ is a rated ideal no-load DC voltage, $U_{di0}$ is an actual ideal no-load DC voltage, K is a positive slope coefficient, and AMAX is the maximum trigger delay angle.

In the manner 5), the determining unit 42 is further used for determining the maximum trigger delay angle according to the formula (6):

$$AMAX = 180° - \arccos\left[\cos \gamma_o - 2 \cdot d_x \cdot \frac{I_d}{I_{dN}} \cdot \frac{U_{di0N}}{U_{di0}} - K(I_o - I_d)\right] - \Delta\alpha \quad (6)$$

where $\gamma_o$ is an extinction angle reference value, $d_x$ is a relative inductive voltage drop, $I_o$ is a DC current instruction value, $I_d$ is an actual DC current on the inverter side of the DC transmission system, $I_{dN}$ is a rated DC current on the inverter side of the DC transmission system, $U_{di0N}$ is a rated ideal no-load DC voltage, $U_{di0}$ is an actual ideal no-load DC voltage, K is a positive slope coefficient, AMAX is the maximum trigger delay angle, and $\Delta\alpha$ a is the trigger delay angle increment.

As an example, the detecting unit 41 is further used for detecting, according to at least one of the following conditions, whether the transient disturbance in the DC transmission system satisfies the disturbance criterion condition:

the deviation between an absolute value of the actual DC current on the inverter side of the DC transmission system and an absolute value of the DC current instruction value is greater than a first threshold;

an absolute value of the change of the DC current on the inverter side of the DC transmission system in a unit time is greater than a second threshold;

the deviation between an absolute value of a DC voltage instruction value on the inverter side of the DC transmission system and an absolute value of an actual DC voltage value is greater than a third threshold;

an absolute value of the change of the DC voltage on the inverter side of the DC transmission system in a unit time is greater than a fourth threshold;

an absolute value of the change of different AC power grid-side currents connected to a second pole of the DC transmission system or a second valve group of a local pole of the DC transmission system in a unit time is greater than a fifth threshold;

an absolute value of the change of different AC power grid-side voltages connected to a second pole of the DC transmission system or a second valve group of a local pole of the DC transmission system in a unit time is greater than a sixth threshold;

a DC transmission local pole of the DC transmission system receives at least one of the following signals from the second pole: a blocking signal, a protection blocking signal, an emergency shutdown signal, a phase shift signal, and a commutation failure predicating signal; and a first valve group of a DC transmission local pole of the DC transmission system receives at least one of the following signals from the second valve group: a blocking signal, a protection blocking signal, an emergency shutdown signal, a phase shift signal, and a commutation failure predicating signal.

In the actual application, the detecting unit 41 and the determining unit 42 may be implemented by using a microprocessor (MCU) or a field programmable gate array (FPGA) in the commutation control apparatus; and the control unit 43 may be implemented by using a limiter and a proportional integral (PI) regulator.

Figure 5:
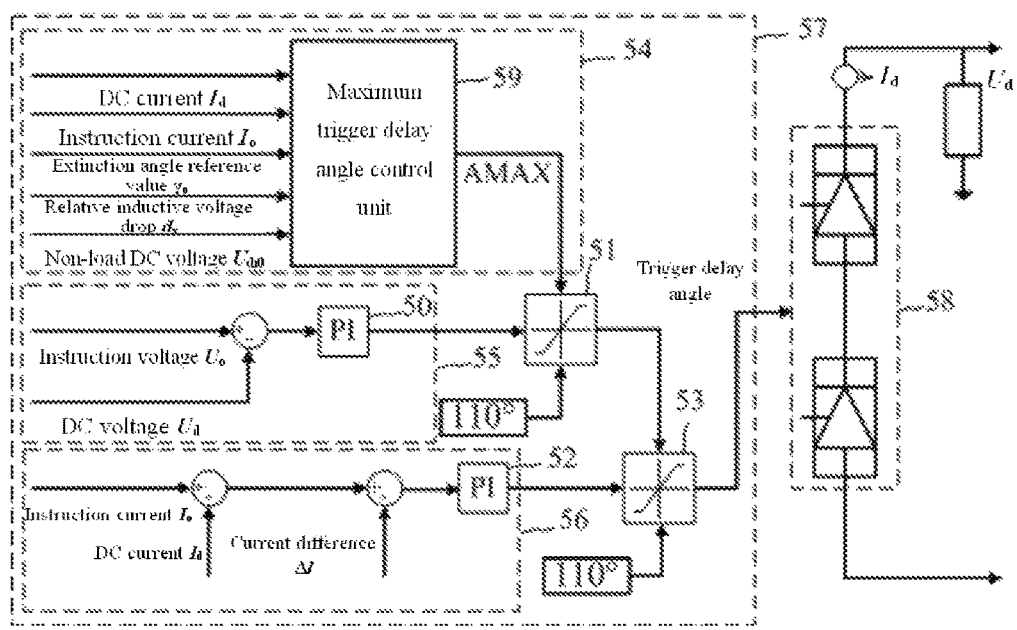
FIG. 5 is a second schematic structural diagram of a commutation control apparatus according to an embodiment of the present invention.

The following descriptions are made with reference to the hardware implementation of the commutation control apparatus in the actual application. The commutation control apparatus 57 shown in FIG. 5 includes a maximum trigger delay angle determining unit 54, a voltage regulating unit 55, and a current regulating unit 56.

The DC current $I_d$, the DC current instruction value $I_o$, the extinction angle reference value $\gamma_o$, the relative inductive voltage drop $d_x$, and the no-load DC voltage $U_{di0}$ are input to the maximum trigger delay angle determining unit 54. A maximum trigger delay angle control unit 59 determines and outputs the maximum trigger delay angle AMAX according to the maximum trigger delay angle control strategy on the inverter side in FIG. 3.

The difference between the DC voltage instruction value $U_o$ and the DC voltage $U_d$ is input to the voltage regulating unit 55, and is output to a limiter 51 through a PI regulator 50 disposed in the voltage regulating unit 55. The lower limit of the limiter 51 is 110°, and the upper limit thereof is the AMAX output by the maximum trigger delay angle determining unit 54.

The difference between the DC current instruction value $I_o$ and the DC current $I_d$ is input to the current regulating unit 56. When applied on the inverter side, the current regulating unit 56 subtracts a current difference ΔI from the above current difference (the difference between the DC current instruction value $I_o$ and the DC current $I_d$), and outputs the obtained result to the PI regulator 52 and then to a limiter 53 through the PI regulator 52. The lower limit of the limiter 53 is 110°, and the upper limit thereof is the output of the limiter 51.

The limiter 53 controls a valve group 58 of a DC transmission device by using the output maximum trigger delay angle. After the current difference is applied to the inverter side, the output value of the current regulator is generally greater than the upper limit of the limiter 53, the output value of the current regulator is the upper limit of the limiter 53; the output value of the voltage regulating unit 55 is generally greater than the maximum trigger delay angle AMAX, and the output of the limiter 51 is its upper limit AMAX. Therefore, the apparatus 57 on the inverter side generally works at the maximum trigger delay angle for control. In view of the above, in the embodiments of the present invention, when the inverter side of the DC transmission system is in steady operation or has small transient disturbance, a commutation voltage drop of the current converter on the inverter side during commutation is determined according to the DC current instruction value, and the maximum trigger delay angle is determined based on the commutation voltage drop. When large transient disturbance occurs on the inverter side of the DC transmission system, if the differences between measurement values of the DC current and the DC voltage and the corresponding instruction values are large, or the changes of the DC current and the DC voltage in a unit time are large, or faults, blocking, and the like occur in the second pole or the second valve group of the local pole of ultra-high-voltage DC transmission, because the actual DC current of the current converter is much greater than the DC current instruction value, the maximum trigger delay angle of the current converter in the presence of large transient disturbance is reduced by using at least one of the following manners: 1) determining a commutation voltage drop with an actual DC current on the inverter side of the DC transmission system, and determining the maximum trigger delay angle based on the commutation voltage drop; 2) determining the maximum trigger delay angle in a manner of increasing an extinction angle with an extinction angle reference value increment; 3) determining the maximum trigger delay angle in a manner of increasing an extinction angle with a trigger delay angle increment; 4) determining the maximum trigger delay angle in a manner of determining a commutation voltage drop with an actual DC current on the inverter side of the DC transmission system, and in a manner of increasing an extinction angle with an extinction angle reference value increment; and 5) determining the maximum trigger delay angle in a manner of determining a commutation voltage drop with an actual DC current on the inverter side of the DC transmission system, and in a manner of increasing an extinction angle with a trigger delay angle increment. That is, disturbance elimination is not performed in a manner of increasing the DC voltage when the maximum trigger delay angle is determined on the inverter side, and instead, a maximum trigger delay angle smaller than that before the large transient disturbance is used in commutation processing. With the control goal of not causing a commutation failure, a current controller on the rectifier side is used to eliminate disturbance, and thus the DC transmission system recovers to a steady operating point.

It would be appreciated by persons of ordinary skill in the art that all or some of the steps of the method in the above embodiments may be performed by relevant hardware as instructed by a program. The program may be stored in a computer readable storage medium. When the program is run, the steps of the method in the embodiments are performed. The storage medium may be any medium that is capable of storing program codes, such as a portable storage device, a random access memory (RAM), a read-only memory (ROM), a magnetic disk, or an optical disc.

Alternatively, if the integrated unit of the present invention is implemented in the form of a software functional module and sold or used as an independent product, the integrated unit may also be stored in a computer readable storage medium. Based on such understanding, the technical solution of the embodiments of the present invention essentially, or the portion contributing to the prior art may be embodied in the form of a software product. The computer software product is stored in a storage medium, and includes several instructions that enable a computer device (which may be a personal computer, a server, or a network device) to execute the whole or a part of the method in the embodiments of the present invention. The storage medium may be any medium that is capable of storing program codes, such as a portable storage device, a RAM, a ROM, a magnetic disk, or an optical disc.

The above descriptions are merely exemplary embodiments of the present invention, and are not intended to limit the protection scope of the present invention. Modifications or replacements readily apparent to persons skilled in the art within the technical scope of the present invention shall fall within the protection scope of the present invention. Therefore, the protection scope of the present invention is subject to the protection scope of the appended claims.

What is claimed is:

1. A commutation control method, comprising:
   detecting whether a transient disturbance in a DC transmission system satisfies a disturbance criterion condition;
   if the transient disturbance satisfies the disturbance criterion condition, determining a maximum trigger delay angle used in a commutation operation performed by a current converter on an inverter side of the DC transmission system, the determined maximum trigger delay angle being smaller than a previous maximum trigger delay angle used before the transient disturbance, comprising
   determining the maximum trigger delay angle in one of the following manners:
   determining a commutation voltage drop with an actual DC current on the inverter side of the DC transmission system, and determining the maximum trigger delay angle based on the commutation voltage drop; or
   determining the maximum trigger delay angle in a manner of increasing an extinction angle with an extinction angle reference value increment; or
   determining the maximum trigger delay angle in a manner of increasing the extinction angle with a trigger delay angle increment; or
   determining the maximum trigger delay angle in a manner of determining the commutation voltage drop with the actual DC current on the inverter side of the DC transmission system, and in a manner of increasing the extinction angle with the extinction angle reference value increment; or
   determining the maximum trigger delay angle in a manner of determining the commutation voltage drop with the actual DC current on the inverter side of the DC transmission system, and in a manner of increasing the extinction angle with the trigger delay angle increment;
   wherein the commutation voltage drop and the extinction angle being both in a negative correlation with the maximum trigger delay angle; and
   controlling the current converter on the inverter side of the DC transmission system to perform the commutation operation based on the determined maximum trigger delay angle.

2. The method according to claim 1, wherein the step of determining the maximum trigger delay angle is done by determining the commutation voltage drop with the actual DC current on the inverter side, and determining the maximum trigger delay angle based on the commutation voltage drop, wherein
   the maximum trigger delay angle is determined according to the following formula:

$$AMAX = 180° - \arccos\left[\cos\gamma_o - 2\cdot d_x \cdot \frac{I_d}{I_{dN}} \cdot \frac{U_{di0N}}{U_{di0}} - K(I_o - I_d)\right]$$

where $\gamma_o$ is the extinction angle reference value, $d_x$ is a relative inductive voltage drop, $I_o$ is a DC current instruction value, $I_d$ is the actual DC current on the inverter side of the DC transmission system, $I_{dN}$ is a rated DC current on the inverter side of the DC transmission system, $U_{di0N}$ is a rated ideal no-load DC voltage, $U_{di0}$ is an actual ideal no-load DC voltage, K is a positive slope coefficient, and AMAX is the maximum trigger delay angle.

3. The method according to claim 1, wherein the step of determining the maximum trigger delay angle is done by determining the maximum trigger delay angle in the manner of increasing the extinction angle with the extinction angle reference value increment wherein:
   the maximum trigger delay angle is determined according to the following formula:

$$AMAX = 180° - \arccos\left[\cos(\gamma_o + \Delta\gamma) - 2\cdot d_x \cdot \frac{I_o}{I_{dN}} \cdot \frac{U_{di0N}}{U_{di0}} - K(I_o - I_d)\right]$$

where $\gamma_o$ is the extinction angle reference value, $\Delta\gamma$ is the extinction angle reference value increment, $d_x$ is a relative inductive voltage drop, $I_o$ is a DC current instruction value, $I_d$ is the actual DC current on the inverter side of the DC transmission system, $I_{dN}$ is a rated DC current on the inverter side of the DC transmission system, $U_{di0N}$ is a rated ideal no-load DC voltage, $U_{di0}$ is an actual ideal no-load DC voltage, K is a positive slope coefficient, and AMAX is the maximum trigger delay angle.

4. The method according to claim 1, wherein the step of determining the maximum trigger delay angle is done by determining the maximum trigger delay angle in the manner of increasing the extinction angle with the trigger delay angle increment wherein:
   the maximum trigger delay angle is determined according to the following formula:

$$AMAX = 180° - \arccos\left[\cos\gamma_o - 2\cdot d_x \cdot \frac{I_o}{I_{dN}} \cdot \frac{U_{di0N}}{U_{di0}} - K(I_o - I_d)\right] - \Delta\alpha$$

where $\gamma_o$ is the extinction angle reference value, $d_x$ is a relative inductive voltage drop, $I_o$ is a DC current instruction value, $I_d$ is the actual DC current on the inverter side of the DC transmission system, $I_{dN}$ is a rated DC current on the inverter side of the DC transmission system, $U_{di0N}$ is a rated ideal no-load DC voltage, $U_{di0}$ is an actual ideal no-load DC voltage, K is a positive slope coefficient, AMAX is the maximum trigger delay angle, and $\Delta\alpha$ is the trigger delay angle increment.

5. The method according to claim 1, wherein the step of determining the maximum trigger delay angle is done by determining the maximum trigger delay angle in the manner of determining the commutation voltage drop with the actual DC current on the inverter side of the DC transmission system, and in the manner of increasing the extinction angle with the extinction angle reference value increment wherein:
the maximum trigger delay angle is determined according to the following formula:

$$AMAX = 180° - \arccos\left[\cos(\gamma_o + \Delta\gamma) - 2 \cdot d_x \cdot \frac{I_d}{I_{dN}} \cdot \frac{U_{di\,0N}}{U_{di\,0}} - K(I_o - I_d)\right]$$

where $\gamma_o$ is the extinction angle reference value, $\Delta\gamma$ is the extinction angle reference value increment, $d_x$ is a relative inductive voltage drop, $I_o$ is a DC current instruction value, $I_d$ is the actual DC current on the inverter side of the DC transmission system, $I_{dN}$ is a rated DC current on the inverter side of the DC transmission system, $U_{di0N}$ is a rated ideal no-load DC voltage, $U_{di0}$ is an actual ideal no-load DC voltage, K is a positive slope coefficient, and AMAX is the maximum trigger delay angle.

6. The method according to claim 1, wherein the step of determining the maximum trigger delay angle is done by determining the maximum trigger delay angle in the manner of determining the commutation voltage drop with the actual DC current on the inverter side of the DC transmission system, and in the manner of increasing the extinction angle with the trigger delay angle increment wherein:
the maximum trigger delay angle is determined according to the following formula:

$$AMAX = 180° - \arccos\left[\cos\gamma_o - 2 \cdot d_x \cdot \frac{I_d}{I_{dN}} \cdot \frac{U_{di\,0N}}{U_{di\,0}} - K(I_o - I_d)\right] - \Delta\alpha$$

where $\gamma_o$ is the extinction angle reference value, $d_x$ is a relative inductive voltage drop, $I_o$ is a DC current instruction value, $I_d$ is the actual DC current on the inverter side of the DC transmission system, $I_{dN}$ is a rated DC current on the inverter side of the DC transmission system, $U_{di0N}$ is a rated ideal no-load DC voltage, $U_{di0}$ is an actual ideal no-load DC voltage, K is a positive slope coefficient, AMAX is the maximum trigger delay angle, and $\Delta\alpha$ is the trigger delay angle increment.

7. The method according to claim 1, wherein the disturbance criterion condition comprises at least one of the following conditions:
a deviation between an absolute value of the actual DC current on the inverter side of the DC transmission system and an absolute value of the DC current instruction value is greater than a first threshold;
an absolute value of a change of the DC current on the inverter side of the DC transmission system in a unit time is greater than a second threshold;
the deviation between an absolute value of a DC voltage instruction value on the inverter side of the DC transmission system and an absolute value of an actual DC voltage value is greater than a third threshold;
an absolute value of a change of a DC voltage on the inverter side of the DC transmission system in the unit time is greater than a fourth threshold;
an absolute value of a change of a plurality of different AC power grid-side currents connected to a second pole of the DC transmission system or a second valve group of a local pole of the DC transmission system in the unit time is greater than a fifth threshold;
an absolute value of a change of a plurality of different AC power grid-side voltages connected to the second pole of the DC transmission system or the second valve group of the local pole of the DC transmission system in the unit time is greater than a sixth threshold;
the local pole of the DC transmission system receives at least one of the following signals from the second pole: a blocking signal, a protection blocking signal, an emergency shutdown signal, a phase shift signal, and a commutation failure predicating signal; and
a first valve group of the local pole of the DC transmission system receives at least one of the following signals from the second valve group: a blocking signal, a protection blocking signal, an emergency shutdown signal, a phase shift signal, and a commutation failure predicating signal.

8. A commutation control apparatus, comprising:
a detecting unit, for detecting whether a transient disturbance in a DC transmission system satisfies a disturbance criterion condition;
a determining unit, for determining a maximum trigger delay angle used in a commutation operation performed by a current converter on an inverter side of the DC transmission system, when the transient disturbance satisfies the disturbance criterion condition, a determined maximum trigger delay angle being smaller than the maximum trigger delay angle used before the transient disturbance, comprising
determining the maximum trigger delay angle in one of the following manners:
determining a commutation voltage drop with an actual DC current on the inverter side of the DC transmission system, and determining the maximum trigger delay angle based on the commutation voltage drop;
determining the maximum trigger delay angle in a manner of increasing an extinction angle with an extinction angle reference value increment;
determining the maximum trigger delay angle in a manner of increasing the extinction angle with a trigger delay angle increment;
determining the maximum trigger delay angle in a manner of determining the commutation voltage drop with the actual DC current on the inverter side of the DC transmission system, and in a manner of increasing the extinction angle with the extinction angle reference value increment; and
determining the maximum trigger delay angle in a manner of determining the commutation voltage drop with the actual DC current on the inverter side of the DC transmission system, and in a manner of increasing the extinction angle with the trigger delay angle increment;
the commutation voltage drop and the extinction angle being both in a negative correlation with the maximum trigger delay angle; and
a control unit, for controlling a current converter on the inverter side of the DC transmission system to perform a commutation operation based on the determined maximum trigger delay angle.

9. The apparatus according to claim 8, wherein
the determining unit is further used for determining the maximum trigger delay angle according to the following formula:

$$AMAX = 180° - \arccos\left[\cos\gamma_o - 2 \cdot d_x \cdot \frac{I_d}{I_{dN}} \cdot \frac{U_{di\,0N}}{U_{di\,0}} - K(I_o - I_d)\right]$$

where $\gamma_o$ is the extinction angle reference value, $d_x$ is a relative inductive voltage drop, $I_o$ is a DC current instruction value, $I_d$ is the actual DC current on the inverter side of the DC transmission system, $I_{dN}$ is a rated DC current on the inverter side of the DC transmission system, $U_{di0N}$ is a rated ideal no-load DC voltage, $U_{di0}$ is an actual ideal no-load DC voltage, K is a positive slope coefficient, and AMAX is the maximum trigger delay angle.

10. The apparatus according to claim 8, wherein the determining unit is further used for determining the maximum trigger delay angle according to the following formula:

$$AMAX = 180° - \arccos\left[\cos(\gamma_o + \Delta\gamma) - 2 \cdot d_x \cdot \frac{I_o}{I_{dN}} \cdot \frac{U_{di\,0N}}{U_{di\,0}} - K(I_o - I_d)\right]$$

where $\gamma_o$ is the extinction angle reference value, $\Delta\gamma$ is the extinction angle reference value increment, $d_x$ is a relative inductive voltage drop, $I_o$ is a DC current instruction value, $I_d$ is the actual DC current on the inverter side of the DC transmission system, $I_{dN}$ is a rated DC current on the inverter side of the DC transmission system, $U_{di0N}$ is a rated ideal no-load DC voltage, $U_{di0}$ is an actual ideal no-load DC voltage, K is a positive slope coefficient, and AMAX is the maximum trigger delay angle.

11. The apparatus according to claim 8, wherein the determining unit is further used for determining the maximum trigger delay angle according to the following formula:

$$AMAX = 180° - \arccos\left[\cos\gamma_o - 2 \cdot d_x \cdot \frac{I_o}{I_{dN}} \cdot \frac{U_{di\,0N}}{U_{di\,0}} - K(I_o - I_d)\right] - \Delta\alpha$$

where $\gamma_o$ is the extinction angle reference value, $d_x$ is a relative inductive voltage drop, $I_o$ is a DC current instruction value, $I_d$ is the actual DC current on the inverter side of the DC transmission system, $I_{dN}$ is a rated DC current on the inverter side of the DC transmission system, $U_{di0N}$ is a rated ideal no-load DC voltage, $U_{di0}$ is an actual ideal no-load DC voltage, K is a positive slope coefficient, AMAX is the maximum trigger delay angle, and $\Delta\alpha$ is the trigger delay angle increment.

12. The apparatus according to claim 8, wherein the determining unit is further used for determining the maximum trigger delay angle according to the following formula:

$$AMAX = 180° - \arccos\left[\cos(\gamma_o + \Delta\gamma) - 2 \cdot d_x \cdot \frac{I_d}{I_{dN}} \cdot \frac{U_{di\,0N}}{U_{di\,0}} - K(I_o - I_d)\right]$$

where $\gamma_o$ is the extinction angle reference value, $\Delta\gamma$ is the extinction angle reference value increment, $d_x$ is a relative inductive voltage drop, $I_o$ is a DC current instruction value, $I_d$ is the actual DC current on the inverter side of the DC transmission system, $I_{dN}$ is a rated DC current on the inverter side of the DC transmission system, $U_{di0N}$ is a rated ideal no-load DC voltage, $U_{di0}$ is an actual ideal no-load DC voltage, K is a positive slope coefficient, and AMAX is the maximum trigger delay angle.

13. The apparatus according to claim 8, wherein the determining unit is further used for determining the maximum trigger delay angle according to the following formula:

$$AMAX = 180° - \arccos\left[\cos\gamma_o - 2 \cdot d_x \cdot \frac{I_d}{I_{dN}} \cdot \frac{U_{di\,0N}}{U_{di\,0}} - K(I_o - I_d)\right] - \Delta\alpha$$

where $\gamma_o$ is the extinction angle reference value, $d_x$ is a relative inductive voltage drop, $I_o$ is a DC current instruction value, $I_d$ is the actual DC current on the inverter side of the DC transmission system, $I_{dN}$ is a rated DC current on the inverter side of the DC transmission system, $U_{di0N}$ is a rated ideal no-load DC voltage, $U_{di0}$ is an actual ideal no-load DC voltage, K is a positive slope coefficient, AMAX is the maximum trigger delay angle, and $\Delta\alpha$ is the trigger delay angle increment.

14. The apparatus according to claim 8, wherein the detecting unit is further used for detecting, according to at least one of the following conditions, whether the transient disturbance in the DC transmission system satisfies the disturbance criterion condition:

a deviation between an absolute value of the actual DC current on the inverter side of the DC transmission system and an absolute value of the DC current instruction value is greater than a first threshold;

an absolute value of a change of the DC current on the inverter side of the DC transmission system in a unit time is greater than a second threshold;

the deviation between an absolute value of a DC voltage instruction value on the inverter side of the DC transmission system and an absolute value of an actual DC voltage value is greater than a third threshold;

an absolute value of the change of the DC voltage on the inverter side of the DC transmission system in a unit time is greater than a fourth threshold;

an absolute value of a change of a plurality of different AC power grid-side currents connected to a second pole of the DC transmission system or a second valve group of a local pole of the DC transmission system in the unit time is greater than a fifth threshold;

an absolute value of a change of a plurality of different AC power grid-side voltages connected to the second pole of the DC transmission system or the second valve group of the local pole of the DC transmission system in the unit time is greater than a sixth threshold;

the local pole of the DC transmission system receives at least one of the following signals from the second pole: a blocking signal, a protection blocking signal, an emergency shutdown signal, a phase shift signal, and a commutation failure predicating signal; or a first valve group of the local pole of the DC transmission system receives at least one of the following signals from the second valve group: a blocking signal, a protection blocking signal, an emergency shutdown signal, a phase shift signal, and a commutation failure predicating signal.

15. The method according to claim 2, wherein the disturbance criterion condition comprises at least one of the following conditions:

a deviation between an absolute value of the actual DC current on the inverter side of the DC transmission system and an absolute value of the DC current instruction value is greater than a first threshold;
an absolute value of a change of the DC current on the inverter side of the DC transmission system in a unit time is greater than a second threshold;
the deviation between an absolute value of a DC voltage instruction value on the inverter side of the DC transmission system and an absolute value of an actual DC voltage value is greater than a third threshold;
an absolute value of a change of a DC voltage on the inverter side of the DC transmission system in the unit time is greater than a fourth threshold;
an absolute value of a change of a plurality of different AC power grid-side currents connected to a second pole of the DC transmission system or a second valve group of a local pole of the DC transmission system in the unit time is greater than a fifth threshold;
an absolute value of a change of a plurality of different AC power grid-side voltages connected to the second pole of the DC transmission system or the second valve group of the local pole of the DC transmission system in the unit time is greater than a sixth threshold;
the local pole of the DC transmission system receives at least one of the following signals from the second pole: a blocking signal, a protection blocking signal, an emergency shutdown signal, a phase shift signal, and a commutation failure predicating signal; and
a first valve group of the local pole of the DC transmission system receives at least one of the following signals from the second valve group: a blocking signal, a protection blocking signal, an emergency shutdown signal, a phase shift signal, and a commutation failure predicating signal.

16. The method according to claim 3, wherein the disturbance criterion condition comprises at least one of the following conditions:
   a deviation between an absolute value of the actual DC current on the inverter side of the DC transmission system and an absolute value of the DC current instruction value is greater than a first threshold;
   an absolute value of a change of the DC current on the inverter side of the DC transmission system in a unit time is greater than a second threshold;
   the deviation between an absolute value of a DC voltage instruction value on the inverter side of the DC transmission system and an absolute value of an actual DC voltage value is greater than a third threshold;
   an absolute value of a change of a DC voltage on the inverter side of the DC transmission system in the unit time is greater than a fourth threshold;
   an absolute value of a change of a plurality of different AC power grid-side currents connected to a second pole of the DC transmission system or a second valve group of a local pole of the DC transmission system in the unit time is greater than a fifth threshold;
   an absolute value of a change of a plurality of different AC power grid-side voltages connected to the second pole of the DC transmission system or the second valve group of the local pole of the DC transmission system in the unit time is greater than a sixth threshold;
   the local pole of the DC transmission system receives at least one of the following signals from the second pole: a blocking signal, a protection blocking signal, an emergency shutdown signal, a phase shift signal, and a commutation failure predicating signal; and
   a first valve group of the local pole of the DC transmission system receives at least one of the following signals from the second valve group: a blocking signal, a protection blocking signal, an emergency shutdown signal, a phase shift signal, and a commutation failure predicating signal.

17. The method according to claim 4, wherein the disturbance criterion condition comprises at least one of the following conditions:
   a deviation between an absolute value of the actual DC current on the inverter side of the DC transmission system and an absolute value of the DC current instruction value is greater than a first threshold;
   an absolute value of a change of the DC current on the inverter side of the DC transmission system in a unit time is greater than a second threshold;
   the deviation between an absolute value of a DC voltage instruction value on the inverter side of the DC transmission system and an absolute value of an actual DC voltage value is greater than a third threshold;
   an absolute value of a change of a DC voltage on the inverter side of the DC transmission system in the unit time is greater than a fourth threshold;
   an absolute value of a change of a plurality of different AC power grid-side currents connected to a second pole of the DC transmission system or a second valve group of a local pole of the DC transmission system in the unit time is greater than a fifth threshold;
   an absolute value of a change of a plurality of different AC power grid-side voltages connected to the second pole of the DC transmission system or the second valve group of the local pole of the DC transmission system in the unit time is greater than a sixth threshold;
   the local pole of the DC transmission system receives at least one of the following signals from the second pole: a blocking signal, a protection blocking signal, an emergency shutdown signal, a phase shift signal, and a commutation failure predicating signal; and
   a first valve group of the local pole of the DC transmission system receives at least one of the following signals from the second valve group: a blocking signal, a protection blocking signal, an emergency shutdown signal, a phase shift signal, and a commutation failure predicating signal.

18. The method according to claim 5, wherein the disturbance criterion condition comprises at least one of the following conditions:
   a deviation between an absolute value of the actual DC current on the inverter side of the DC transmission system and an absolute value of the DC current instruction value is greater than a first threshold;
   an absolute value of a change of the DC current on the inverter side of the DC transmission system in a unit time is greater than a second threshold;
   the deviation between an absolute value of a DC voltage instruction value on the inverter side of the DC transmission system and an absolute value of an actual DC voltage value is greater than a third threshold;
   an absolute value of a change of a DC voltage on the inverter side of the DC transmission system in the unit time is greater than a fourth threshold;
   an absolute value of a change of a plurality of different AC power grid-side currents connected to a second pole of the DC transmission system or a second valve group of a local pole of the DC transmission system in the unit time is greater than a fifth threshold;

an absolute value of a change of a plurality of different AC power grid-side voltages connected to the second pole of the DC transmission system or the second valve group of the local pole of the DC transmission system in the unit time is greater than a sixth threshold;

the local pole of the DC transmission system receives at least one of the following signals from the second pole: a blocking signal, a protection blocking signal, an emergency shutdown signal, a phase shift signal, and a commutation failure predicating signal; and a first valve group of the local pole of the DC transmission system receives at least one of the following signals from the second valve group: a blocking signal, a protection blocking signal, an emergency shutdown signal, a phase shift signal, and a commutation failure predicating signal.

19. The method according to claim 6, wherein the disturbance criterion condition comprises at least one of the following conditions:

a deviation between an absolute value of the actual DC current on the inverter side of the DC transmission system and an absolute value of the DC current instruction value is greater than a first threshold;

an absolute value of a change of the DC current on the inverter side of the DC transmission system in a unit time is greater than a second threshold;

the deviation between an absolute value of a DC voltage instruction value on the inverter side of the DC transmission system and an absolute value of an actual DC voltage value is greater than a third threshold;

an absolute value of a change of a DC voltage on the inverter side of the DC transmission system in the unit time is greater than a fourth threshold;

an absolute value of a change of a plurality of different AC power grid-side currents connected to a second pole of the DC transmission system or a second valve group of a local pole of the DC transmission system in the unit time is greater than a fifth threshold;

an absolute value of a change of a plurality of different AC power grid-side voltages connected to the second pole of the DC transmission system or the second valve group of the local pole of the DC transmission system in the unit time is greater than a sixth threshold;

the local pole of the DC transmission system receives at least one of the following signals from the second pole: a blocking signal, a protection blocking signal, an emergency shutdown signal, a phase shift signal, and a commutation failure predicating signal; and a first valve group of the local pole of the DC transmission system receives at least one of the following signals from the second valve group: a blocking signal, a protection blocking signal, an emergency shutdown signal, a phase shift signal, and a commutation failure predicating signal.

20. The apparatus according to claim 9, wherein the detecting unit is further used for detecting, according to at least one of the following conditions, whether the transient disturbance in the DC transmission system satisfies the disturbance criterion condition:

a deviation between an absolute value of the actual DC current on the inverter side of the DC transmission system and an absolute value of the DC current instruction value is greater than a first threshold;

an absolute value of a change of the DC current on the inverter side of the DC transmission system in a unit time is greater than a second threshold;

the deviation between an absolute value of a DC voltage instruction value on the inverter side of the DC transmission system and an absolute value of an actual DC voltage value is greater than a third threshold;

an absolute value of the change of the DC voltage on the inverter side of the DC transmission system in a unit time is greater than a fourth threshold;

an absolute value of a change of a plurality of different AC power grid-side currents connected to a second pole of the DC transmission system or a second valve group of a local pole of the DC transmission system in the unit time is greater than a fifth threshold;

an absolute value of a change of a plurality of different AC power grid-side voltages connected to the second pole of the DC transmission system or the second valve group of the local pole of the DC transmission system in the unit time is greater than a sixth threshold;

the local pole of the DC transmission system receives at least one of the following signals from the second pole: a blocking signal, a protection blocking signal, an emergency shutdown signal, a phase shift signal, and a commutation failure predicating signal; or a first valve group of the local pole of the DC transmission system receives at least one of the following signals from the second valve group: a blocking signal, a protection blocking signal, an emergency shutdown signal, a phase shift signal, and a commutation failure predicating signal.

21. The apparatus according to claim 10, wherein the detecting unit is further used for detecting, according to at least one of the following conditions, whether the transient disturbance in the DC transmission system satisfies the disturbance criterion condition:

a deviation between an absolute value of the actual DC current on the inverter side of the DC transmission system and an absolute value of the DC current instruction value is greater than a first threshold;

an absolute value of a change of the DC current on the inverter side of the DC transmission system in a unit time is greater than a second threshold;

the deviation between an absolute value of a DC voltage instruction value on the inverter side of the DC transmission system and an absolute value of an actual DC voltage value is greater than a third threshold;

an absolute value of the change of the DC voltage on the inverter side of the DC transmission system in a unit time is greater than a fourth threshold;

an absolute value of a change of a plurality of different AC power grid-side currents connected to a second pole of the DC transmission system or a second valve group of a local pole of the DC transmission system in the unit time is greater than a fifth threshold;

an absolute value of a change of a plurality of different AC power grid-side voltages connected to the second pole of the DC transmission system or the second valve group of the local pole of the DC transmission system in the unit time is greater than a sixth threshold;

the local pole of the DC transmission system receives at least one of the following signals from the second pole: a blocking signal, a protection blocking signal, an emergency shutdown signal, a phase shift signal, and a commutation failure predicating signal; or a first valve group of the local pole of the DC transmission system receives at least one of the following signals from the second valve group: a blocking signal, a protection blocking signal, an emergency shutdown signal, a phase shift signal, and a commutation failure predicating signal.

22. The apparatus according to claim 11, wherein the detecting unit is further used for detecting, according to at least one of the following conditions, whether the transient disturbance in the DC transmission system satisfies the disturbance criterion condition:
a deviation between an absolute value of the actual DC current on the inverter side of the DC transmission system and an absolute value of the DC current instruction value is greater than a first threshold;
an absolute value of a change of the DC current on the inverter side of the DC transmission system in a unit time is greater than a second threshold;
the deviation between an absolute value of a DC voltage instruction value on the inverter side of the DC transmission system and an absolute value of an actual DC voltage value is greater than a third threshold;
an absolute value of the change of the DC voltage on the inverter side of the DC transmission system in a unit time is greater than a fourth threshold;
an absolute value of a change of a plurality of different AC power grid-side currents connected to a second pole of the DC transmission system or a second valve group of a local pole of the DC transmission system in the unit time is greater than a fifth threshold;
an absolute value of a change of a plurality of different AC power grid-side voltages connected to the second pole of the DC transmission system or the second valve group of the local pole of the DC transmission system in the unit time is greater than a sixth threshold;
the local pole of the DC transmission system receives at least one of the following signals from the second pole: a blocking signal, a protection blocking signal, an emergency shutdown signal, a phase shift signal, and a commutation failure predicating signal; or
a first valve group of the local pole of the DC transmission system receives at least one of the following signals from the second valve group: a blocking signal, a protection blocking signal, an emergency shutdown signal, a phase shift signal, and a commutation failure predicating signal.

23. The apparatus according to claim 12, wherein the detecting unit is further used for detecting, according to at least one of the following conditions, whether the transient disturbance in the DC transmission system satisfies the disturbance criterion condition:
a deviation between an absolute value of the actual DC current on the inverter side of the DC transmission system and an absolute value of the DC current instruction value is greater than a first threshold;
an absolute value of a change of the DC current on the inverter side of the DC transmission system in a unit time is greater than a second threshold;
the deviation between an absolute value of a DC voltage instruction value on the inverter side of the DC transmission system and an absolute value of an actual DC voltage value is greater than a third threshold;
an absolute value of the change of the DC voltage on the inverter side of the DC transmission system in a unit time is greater than a fourth threshold;
an absolute value of a change of a plurality of different AC power grid-side currents connected to a second pole of the DC transmission system or a second valve group of a local pole of the DC transmission system in the unit time is greater than a fifth threshold;
an absolute value of a change of a plurality of different AC power grid-side voltages connected to the second pole of the DC transmission system or the second valve group of the local pole of the DC transmission system in the unit time is greater than a sixth threshold;
the local pole of the DC transmission system receives at least one of the following signals from the second pole: a blocking signal, a protection blocking signal, an emergency shutdown signal, a phase shift signal, and a commutation failure predicating signal; or
a first valve group of the local pole of the DC transmission system receives at least one of the following signals from the second valve group: a blocking signal, a protection blocking signal, an emergency shutdown signal, a phase shift signal, and a commutation failure predicating signal.

24. The apparatus according to claim 13, wherein the detecting unit is further used for detecting, according to at least one of the following conditions, whether the transient disturbance in the DC transmission system satisfies the disturbance criterion condition:
a deviation between an absolute value of the actual DC current on the inverter side of the DC transmission system and an absolute value of the DC current instruction value is greater than a first threshold;
an absolute value of a change of the DC current on the inverter side of the DC transmission system in a unit time is greater than a second threshold;
the deviation between an absolute value of a DC voltage instruction value on the inverter side of the DC transmission system and an absolute value of an actual DC voltage value is greater than a third threshold;
an absolute value of the change of the DC voltage on the inverter side of the DC transmission system in a unit time is greater than a fourth threshold;
an absolute value of a change of a plurality of different AC power grid-side currents connected to a second pole of the DC transmission system or a second valve group of a local pole of the DC transmission system in the unit time is greater than a fifth threshold;
an absolute value of a change of a plurality of different AC power grid-side voltages connected to the second pole of the DC transmission system or the second valve group of the local pole of the DC transmission system in the unit time is greater than a sixth threshold;
the local pole of the DC transmission system receives at least one of the following signals from the second pole: a blocking signal, a protection blocking signal, an emergency shutdown signal, a phase shift signal, and a commutation failure predicating signal; or
a first valve group of the local pole of the DC transmission system receives at least one of the following signals from the second valve group: a blocking signal, a protection blocking signal, an emergency shutdown signal, a phase shift signal, and a commutation failure predicating signal.

* * * * *